(12) United States Patent
Narayanan et al.

(10) Patent No.: US 10,225,169 B2
(45) Date of Patent: Mar. 5, 2019

(54) METHOD AND APPARATUS FOR AUTONOMOUSLY RELAYING STATISTICS TO A NETWORK CONTROLLER IN A SOFTWARE-DEFINED NETWORKING NETWORK

(71) Applicant: Telefonaktiebolaget L M Ericsson (publ), Stockholm (SE)

(72) Inventors: Bhalaji Narayanan, Bangalore (IN); Muthukumaran Kothandaraman, Bangalore (IN); Shuva Jyoti Kar, Bangalore (IN)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 181 days.

(21) Appl. No.: 14/949,879

(22) Filed: Nov. 23, 2015

(65) Prior Publication Data

US 2017/0149640 A1    May 25, 2017

(51) Int. Cl.
*H04L 12/24*  (2006.01)
*H04L 12/26*  (2006.01)
*H04L 12/851* (2013.01)

(52) U.S. Cl.
CPC ........ *H04L 43/0852* (2013.01); *H04L 41/142* (2013.01); *H04L 43/062* (2013.01); *H04L 43/16* (2013.01); *H04L 47/2483* (2013.01)

(58) Field of Classification Search
CPC ............. H04L 43/0852; H04L 47/2483; H04L 43/062
See application file for complete search history.

(56) References Cited

U.S. PATENT DOCUMENTS

| 7,543,052 | B1 * | 6/2009 | Cesa Klein | ........... H04L 43/026 709/223 |
| 9,014,047 | B2 * | 4/2015 | Alcala | ................... H04L 43/022 370/235 |
| 9,356,857 | B1 * | 5/2016 | Narayanan | ............ H04L 45/502 |

(Continued)

OTHER PUBLICATIONS

Onf: OpenFlow Switch Specification—Version 1.5.1 (Protocol version 0x06), Open Networking Foundation, Mar. 26, 2015, pp. 1-283.

(Continued)

*Primary Examiner* — Noel R Beharry
*Assistant Examiner* — Rodrick Mak
(74) *Attorney, Agent, or Firm* — Nicholson De Vos Webster & Elliott LLP

(57) ABSTRACT

Methods and apparatuses for autonomous relay of statistics from a network device to a network controller of a software-defined networking (SDN) network are described. The network controller is operative to transmit a message including a statistics profile, where the statistics profile includes a type of data to be collected associated with a behavior of a flow at the network device and a set of one or more criteria; where the message causes the network device to transmit a statistics message associated with one or more flows when the one or more flows satisfy at least one criterion from the set of one or more criteria, where the statistics message includes data collected at the network device associated with a behavior of the one or more flows as identified by the type of data to be collected included in the statistics profile.

14 Claims, 13 Drawing Sheets

(56) References Cited

U.S. PATENT DOCUMENTS

| | | | | |
|---|---|---|---|---|
| 2002/0143911 | A1* | 10/2002 | Vicente | H04L 29/06 709/223 |
| 2003/0232614 | A1* | 12/2003 | Squibbs | G06Q 30/02 455/405 |
| 2013/0159395 | A1* | 6/2013 | Backholm | H04L 29/08099 709/203 |
| 2015/0063110 | A1* | 3/2015 | Choi | H04L 41/0833 370/235 |
| 2015/0319057 | A1 | 11/2015 | Jocha et al. | |
| 2016/0127975 | A1* | 5/2016 | Hu | H04W 40/246 455/445 |
| 2016/0262044 | A1* | 9/2016 | Calin | H04W 28/0268 |

OTHER PUBLICATIONS

Roberto Bifulco et al., "BEBA Behavioural Based Forwarding: Deliverable Report D4.1—Support Mechanisms for Control Task Offloading", Aug. 31, 2015, pp. 1-74.
"OpenFlow Switch Specification; Version 1.5.0 (Protocol version 0x06)", Open Networking Foundation, Dec. 19, 2014, pp. 1-277.
J. Postel, "User Datagram Protocol," Aug. 28, 1980, 3 pages, RFC: 768.
"Transmission Control Protocol, DARPA Internet Program Protocol Specification," Sep. 1981, 91 pages, RFC: 793, Information Sciences Institute, University of Southern California, Marina del Rey, California.
C. Hedrick, "Routing Information Protocol," Jun. 1988, 33 pages, Network Working Group, Request for Comments: 1058.
David Oran, "OSI IS-IS Intra-domain Routing Protocol," Feb. 1990, 157 pages, Network Working Group, Request for Comments: 1142.
T. Socolofsky, et al., "A TCP/IP Tutorial," Jan. 1991, 28 pages, Network Working Group, Request for Comments: 1180.
G. Malkin, et al., "RIPng for IPv6," Jan. 1997, 19 pages, Network Working Group, Request for Comments: 2080.
R. Braden, et al., "Resource ReSerVation Protocol (RSVP)—Version 1 Functional Specification," Sep. 1997, 112 pages, Network Working Group, Request for Comments: 2205.
J. Wroclawski, "The Use of RSVP with IETF Integrated Services," Sep. 1997, 33 pages, Network Working Group, Request for Comments: 2210.
J. Wroclawski, "Specification of the Controlled-Load Network Element Service," Sep. 1997, 19 pages, Network Working Group, Request for Comments: 2211.
S. Shenker, et al., "Specification of Guaranteed Quality of Service," Sep. 1997, 20 pages, Network Working Group, Request for Comments: 2212.
J. Moy, "OSPF Version 2," Apr. 1998, 244 pages, Network Working Group, Request for Comments: 2328, The Internet Society.
G. Malkin, "RIP Version 2," Nov. 1998, 39 pages, Network Working Group, Request for Comments: 2453, The Internet Society.
S. Deering, et al., "Internet Protocol, Version 6 (IPv6) Specification," Dec. 1998, 39 pages, Network Working Group, Request for Comments: 2460, The Internet Society.
K. Nichols, et al., "Definition of the Differentiated Services Field (DS Field) in the IPv4 and IPv6 Headers," Dec. 1998, 20 pages, Network Working Group, Request for Comments: 2474, The Internet Society.
S. Blake, et al., "An Architecture for Differentiated Services," Dec. 1998, 36 pages, Network Working Group, Request for Comments: 2475, The Internet Society.
J. Heinanen, et al., "Assured Forwarding PHB Group," Jun. 1999, 11 pages, Network Working Group, Request for Comments: 2597, The Internet Society.
D. Borman, et al., "IPv6 Jumbograms," Aug. 1999, 9 pages, Network Working Group, Request for Comments: 2675, The Internet Society.
D. Black, "Differentiated Services and Tunnels," Oct. 2000, 14 pages, Network Working Group, Request for Comments: 2983, The Internet Society.

K. Nichols, et al., "Definition of Differentiated Services Per Domain Behaviors and Rules for their Specification," April 2001, 24 pages, Network Working Group, Request for Comments: 3086, The Internet Society.
D. Black, et al., "Per Hop Behavior Identification Codes," Jun. 2001, 8 pages, Network Working Group, Request for Comments: 3140, The Internet Society.
D. Awduche, et al., "RSVP-TE: Extensions to RSVP for LSP Tunnels," Dec. 2001, 61 pages, Network Working Group, Request for Comments: 3209, The Internet Society.
B. Davie, et al., "An Expedited Forwarding PHB (Per-Hop Behavior)," Mar. 2002, 16 pages, Network Working Group, Request for Comments: 3246, The Internet Society.
A. Charny, et al., "Supplemental Information for the New Definition of the EF PHB (Expedited Forwarding Per-Hop Behavior)," Mar. 2002, 24 pages, Network Working Group, Request for Comments: 3247, The Internet Society.
D. Grossman, "New Terminology and Clarifications for Diffserv," Apr. 2002, 10 pages, Network Working Group, Request for Comments: 3260, The Internet Society.
F. Baker, et al., "Management Information Base for the Differentiated Services Architecture," May 2002, 116 pages, Network Working Group, Request for Comments: 3289, The Internet Society.
Y. Bernet, et al., "An Informal Management Model for Diffserv Routers," May 2002, 56 pages, Network Working Group, Request for Comments: 3290, The Internet Society.
K. Chan, et al., "Differentiated Services Quality of Service Policy Information Base," Mar. 2003, 96 pages, Network Working Group, Request for Comments: 3317, The Internet Society.
L. Berger, "Generalized Multi-Protocol Label Switching (GMPLS) Signaling Resource ReserVation Protocol-Traffic Engineering (RSVP-TE) Extensions," Jan. 2003, 42 pages, Network Working Group, Request for Comments: 3473, The Internet Society.
K. Kompella, et al., "Procedures for Modifying the Resource reSerVation Protocol (RSVP)," Oct. 2004, 7 pages, Network Working Group, Request for Comments: 3936, The Internet Society.
B. Fenner, et al., "Management Information Base for the User Datagram Protocol (UDP)," Jun. 2005, 19 pages, Network Working Group, Request for Comments: 4113, The Internet Society.
Y. Rekhter, et al., "A Border Gateway Protocol 4 (BGP-4)," Jan. 2006, 104 pages, Network Working Group, Request for Comments: 4271, The Internet Society.
S. Kent, et al., "Security Architecture for the Internet Protocol," Dec. 2005, 101 pages, Network Working Group, Request for Comments: 4301, The Internet Society.
R. Housley, et al., "Using Advanced Encryption Standard (AES) CCM Mode with IPsec Encapsulating Security Payload (ESP)," Dec. 2005, 13 pages, Network Working Group, Request for Comments: 4309, The Internet Society.
E. Rosen, et al., "BGP/MPLS IP Virtual Private Networks (VPNs)," Feb. 2006, 47 pages, Network Working Group, Request for Comments: 4364, The Internet Society.
J. Polk, et al., "A Resource Reservation Protocol (RSVP) Extension for the Reduction of Bandwidth of a Reservation Flow," May 2006, 21 pages, Network Working Group, Request for Comments: 4495, The Internet Society.
Z. Ali, et al., "Node-ID Based Resource Reservation Protocol (RSVP) Hello: A Clarification Statement," Jun. 2006, 7 pages, Network Working Group, Request for Comments: 4558, The Internet Society.
J. Babiarz, et al., "Configuration Guidelines for DiffServ Service Classes," Aug. 2006, 57 pages, Network Working Group, Request for Comments: 4594, The Internet Society.
L. Andersson, et al., "LDP Specification," Oct. 2007, 135 pages, Network Working Group, Request for Comments: 5036, The IETF Trust.
R. Coltun, et al., "OSPF for IPv6," Jul. 2008, 94 pages, Network Working Group, Request for Comments: 5340, The IETF Trust.
L. Eggert, et al., "Unicast UDP Usage Guidelines for Application Designers," Nov. 2008, 27 pages, Network Working Group, Request for Comments: 5405, IETF Trust and the persons identified as the document authors.

(56) References Cited

OTHER PUBLICATIONS

F. Baker, et al., "A Differentiated Services Code Point (DSCP) for Capacity-Admitted Traffic," May 2010, 14 pages, Internet Engineering Task Force (IETF), Request for Comments: 5865, IETF Trust and the persons identified as the document authors.

* cited by examiner

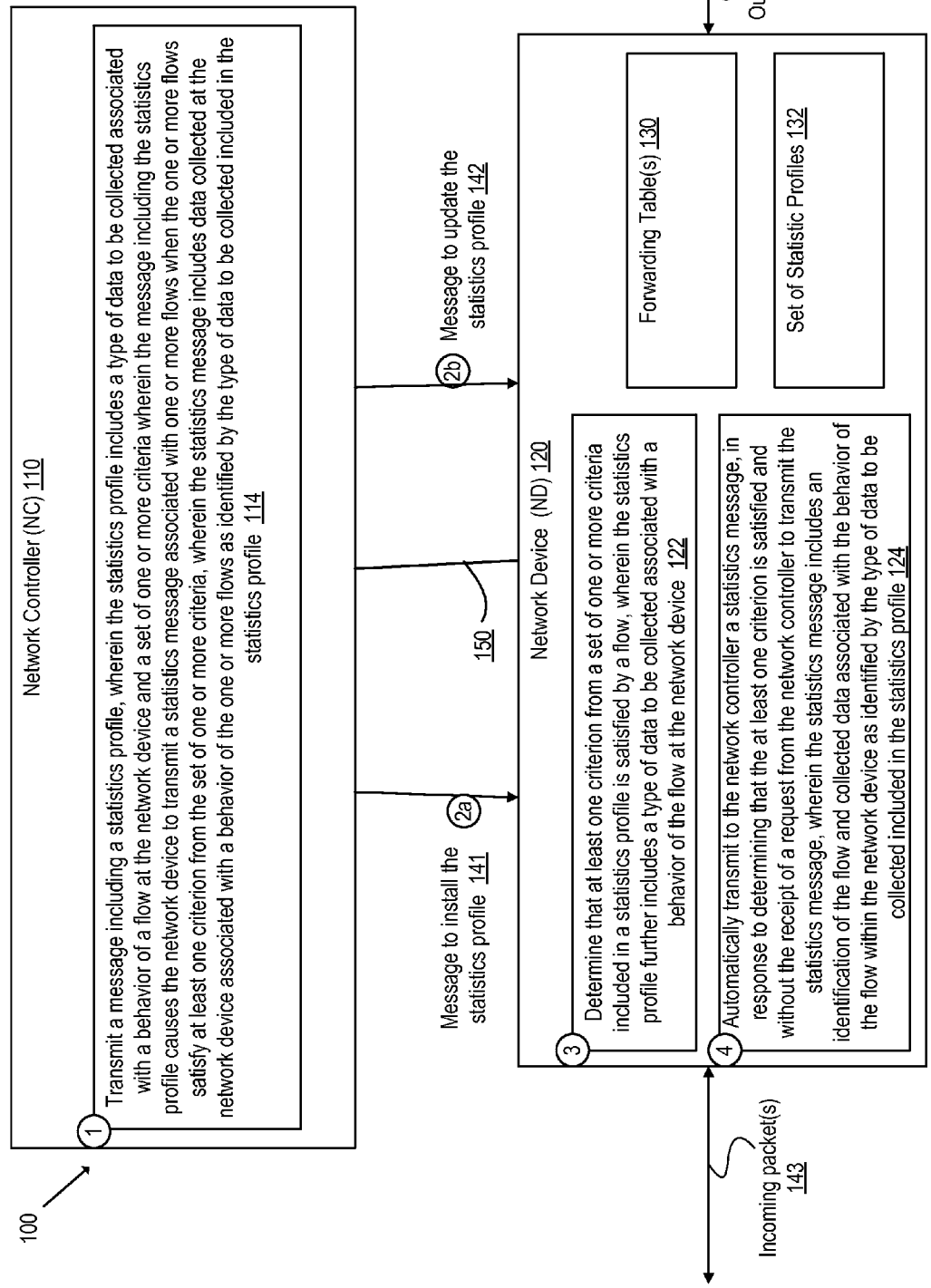

200

```
┌─────────────────────────────────────────────────────────────────────┐
│ Construct a message including a statistics profile, where the       │
│ statistics profile includes a type of data to be collected          │
│ associated with a behavior of a flow at the network device and a    │
│ set of one or more criteria                                         │
│                              202                                    │
└─────────────────────────────────────────────────────────────────────┘
                                  │
                                  ▼
┌─────────────────────────────────────────────────────────────────────┐
│ Transmit the message including the statistics profile and an install│
│ profile command, wherein the statistics profile includes the type   │
│ of data to be collected associated with a behavior of a flow at the │
│ network device and the set of one or more criteria                  │
│                              204                                    │
└─────────────────────────────────────────────────────────────────────┘
                                  │
                                  ▼
┌─────────────────────────────────────────────────────────────────────┐
│ Cause the network device to store the statistics profile in response│
│ to receiving the message including the install profile command     │
│                              206                                    │
└─────────────────────────────────────────────────────────────────────┘
```

Construct a message including a statistics profile, a modify profile command, and a set of one or more packet match fields respectively identifying the one or more flows
302

↓

Transmit the message including the statistics profile, the modify profile command, and the set of one or more packet match fields respectively identifying the one or more flows, where the statistics profile includes a type of data to be collected associated with a behavior of a flow at the network device and a set of one or more criteria
304

↓

Cause the network device to update the statistics profile to include the set of one or more packet match fields
306

↓

Cause the network device to transmit a statistics message associated with one or more flows when the one or more flows satisfy at least one criterion from the set of criteria, and the one or more flows are identified based on the set of one or more packet match fields
308

FIG. 3

```
struct a_msg_stat_profile {
    struct ofp_header header;                                      /* OFPT_EXPERIMENTER. */
602
604 uint32_t experimenter;                                         /* a_EXPERIMENTER_ID. */
606 uint32_t exp_msg_type;                                         /* a_MSG_STAT_PROFILE */
608 uint8_t commandType;                                           /* one of a_SPCT_ **/
610 uint64_t profileId;                                            /* Profile Identifier */
612 uint64_t monitorStartTime;                                     /* Monitor begin time */
614 uint64_t monitorEndTime;                                       /* Monitor end time */
616 uint8_t profileFlags;                                          /* Bit 0, if set to 0: no periodic relay, if set to 1: periodic relay enabled */
618 uint64_t relayInterval;                                        /* Interval at which this profile thread wakes up */
620 uint64_t aggregate_data_limit;                                 /* byte count in a flow that cannot be exceeded */
622 uint64_t burst_level;                                          /* byte count in a flow that cannot be exceeded in a single relay interval */
624 uint64_t ele_flow_tolerance;                                   /* time for which a flow can exist in the system beyond which it will be
                                                                      termed as elephant flow */
626 uint16_t total_flow_limit_info_len;                            /* Total length of the flow-limit-info entries */
628 struct a_flow_limit_info flow_limit_info_list[];               /* Contains table id and allowed flow-limit details. */
630 uint32_t total_match_info_len;                                 /* Total length of the list of flow-matches. */
632 uint8_t pad[3];
634 struct a_ofp_match_info flow_match_info_list[];                /* list of set of Match fields. */
}; OFP_ASSERT(sizeof(struct a_msg_stat_profile) == 112);
```

```
600B    enum a_stat_profile_cmd_type {
636         a_SPCT_PROFILE_CREATE,
638         a_SPCT_PROFILE_MODIFY,
640         a_SPCT_PROFILE_REMOVE
        };
```

FIG. 6B

```
600C
struct a_flow_limit_info {
642     uint8_t table_id;        /* ID of table to read */
644     uint32_t flow_limit;     /* Threshold No. of flows */
646     uint8_t pad[3];
};OFP_ASSERT(sizeof(struct a_flow_limit_info) == 8);
```

FIG. 6C

```
600D
struct a_ofp_match_info {
648  uint32_t match_len;    /*Total length of the match-fields*/
650  uint8_t table_id;      /* ID of table to read*/
652  uint8_t mod_mode;      /*Takes one value from 600E */
654  uint8_t pad[2];
656  struct ofp_match match[]; /*Match Fields */
};
OFP_ASSERT(sizeof(struct a_ofp_match_info) == 8);
```

FIG. 6D

```
600E
        enum a_flowref_mod_mode {
658         a_FRMM_MERGE = 1,
660         a_FRMM_REPLACE = 2,
662         a_FRMM_REMOVE = 3
        };
```

FIG. 6E

```
600F
struct a_flow_alert {
670    struct ofp_header header;
672    uint32_t experimenter;          /* a_EXPERIMENTER_ID. */
674    uint32_t exp_msg_type;          /* a_MSG_STAT_ALERT */
676
678    uint64_t profileId;             /* Profile Id */
680    uint32_t total_match_info_len;  /* Total length of the list of flow-matches. */
682    uint8_t a_alert_type alert_type; /* One of a_SPAT_* */
684
686    uint32_t total_match_info_len;  /* Total length of the list of flow-matches. */
688    uint8_t pad[7];
690    struct a_ofp_match_info flow_match_info_list[]; /* list of set of Match
                                                fields. Variable sized list. */
};     OFP_ASSERT(sizeof(struct a_flow_alert) == 40);
```

FIG. 6F

```
600G
 enum a_alert_type {
692       a_SPAT_AGGREGATE_FLOW_EXCEEDED = 1;
694       a_SPAT_BURSTY_FLOW_DETECTED = 2;
696       a_SPAT_ELEPHANT_FLOW_DETECTED = 3;
     };
```

FIG. 6G

```
600H struct a_flow_limit_alert {
    702    struct ofp_header header;
    704    uint32_t experimenter;    /* a_EXPERIMENTER_ID. */
    706    uint32_t exp_msg_type;    /*a_MSG_FLOW_LIMIT_ALERT */
    708    uint64_t profileId;       /* Profile Id */
    710    uint8_t tableId;          /* Table Reference */
    712    uint8_t pad[7];
    };
    OFP_ASSERT(sizeof(struct a_flow_limit_alert) == 32);
```

FIG. 6H

```
600I
struct a_flow_stats_info {
    714    struct ofp_header header;
    716    uint32_t experimenter;                    /* a_EXPERIMENTER_ID. */
    718    uint32_t exp_msg_type;                    /* a_MSG_FLOW_STAT_INFO */
    720    uint64_t packet_count;                    /*Number of packets in flows*/
    722    uint64_t byte_count;                      /* Number of bytes in flows*/
    724    uint32_t flow_count;                      /* Number of flows. */
    726    uint8_t pad[4];                           /* Align to 64 bits. */
    728    struct a_ofp_match_info matchInfo[];      /* Flow Reference */
    };
    OFP_ASSERT(sizeof(struct a_flow_stats_info) == 40);
```

FIG. 6I

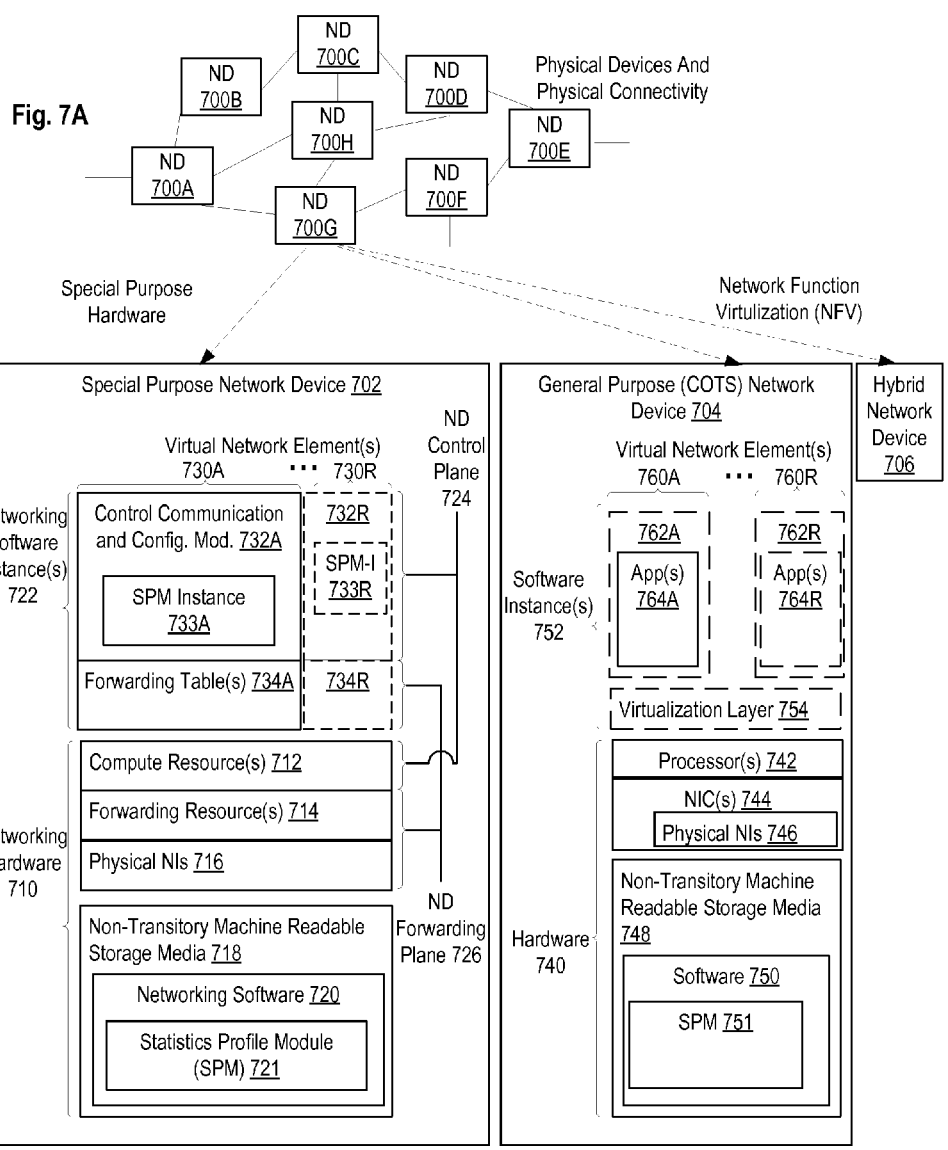

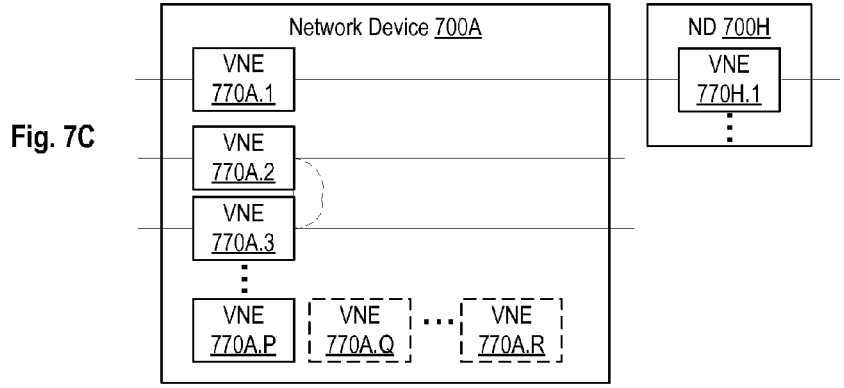
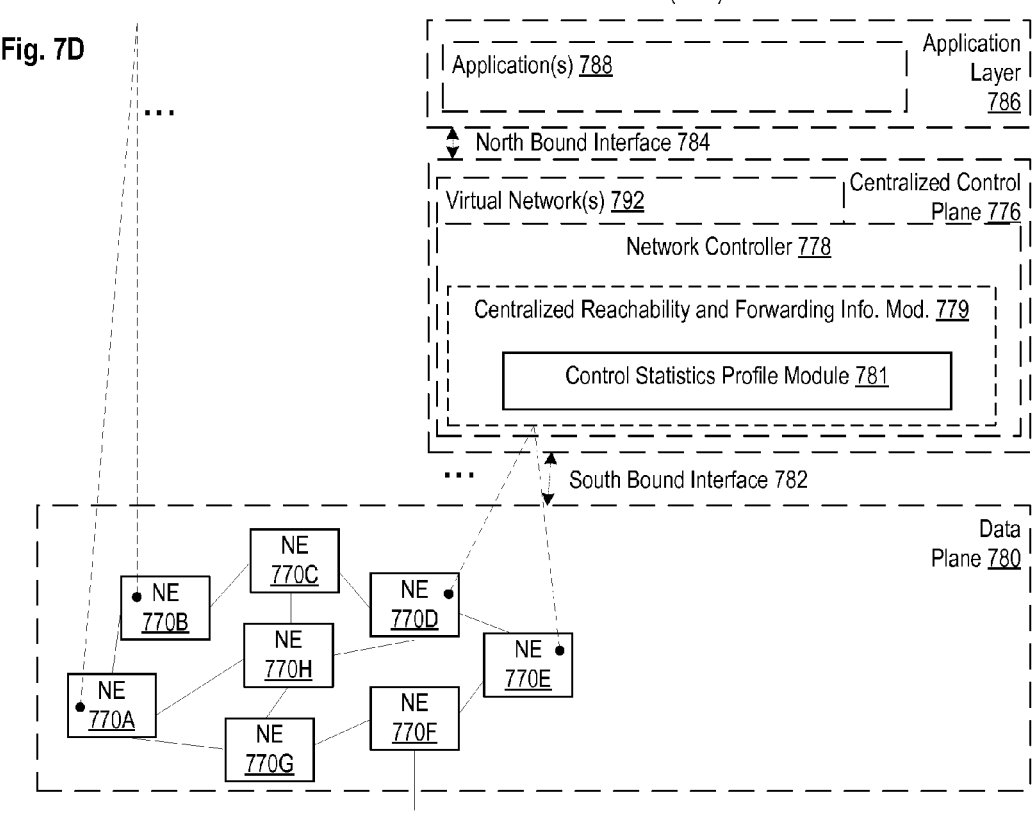
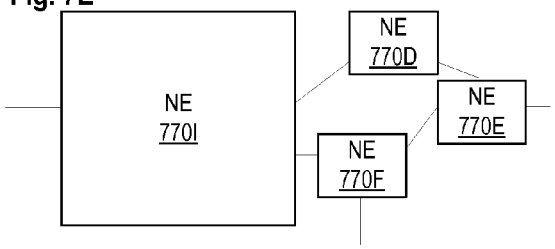
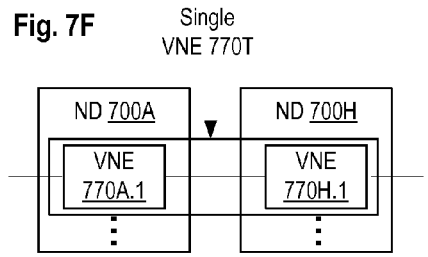

METHOD AND APPARATUS FOR AUTONOMOUSLY RELAYING STATISTICS TO A NETWORK CONTROLLER IN A SOFTWARE-DEFINED NETWORKING NETWORK

FIELD

Embodiments of the invention relate to the field of packet networking; and more specifically, to relaying statistics to a network controller in a software-defined networking network.

BACKGROUND

Software-Defined Networking (SDN) is an approach to computer networking that allows network administrators to manage network services through abstraction of lower-level functionality. This is done by decoupling the system that makes decisions about where traffic is sent (the control plane) from the underlying systems that forward traffic to the selected destination (the data plane). In such a system, a network controller, which is typically deployed as a cluster of server nodes, has the role of the control plane and is coupled to one or more network elements that have the role of the data plane. Each network element may be implemented on one or multiple network devices. The control connection between the network controller and network elements is generally a TCP/UDP based communication. The network controller communicates with the network elements using an SDN protocol (e.g., OpenFlow, I2RS, etc.).

For implementing SDN, the Open Networking Foundation (ONF), an industrial consortium focusing on commercializing SDN and its underlying technologies, has defined a set of open commands, functions, and protocols. The defined protocol suites are known as the OpenFlow (OF) protocol. The network controller, acting as the control plane, may then program the data plane on the network elements by causing packet handling rules to be installed on the forwarding network elements using OF commands and messages. These packet handling rules may have criteria to match various packet types as well as actions that may be performed on those packets. The forwarding plane includes forwarding tables (e.g., flow tables, group tables) which may be distributed across multiple data-path network elements.

In a typical deployment, the SDN controller can collect real-time or near real-time statistics associated with the behavior of flows processed at the data plane. These statistics may be requested by overlaying applications and used to determine a state of the network. For example, the north bound applications may need to retrieve a byte count and a packet count for each flow processed at the data plane. The application may then determine: (1) whether these quantities (e.g., flow's packet/byte aggregate count) exceed a given threshold; (2) whether there is a burst in traffic during a given time window for a given flow; and/or (3) whether a flow has exceeded an allowed time-limit and should be considered an Elephant flow.

In current approaches, the control plane (i.e., the network controller) periodically sends statistics requests to the different network devices including the forwarding network elements and retrieves the statistics for the desired flows. The network controller then receives responses from the forwarding network elements including the requested statistics. These messages are used to gather flow statistics from the forwarding network elements. For this purpose, the control network providing connectivity between the network controller and the forwarding network elements is used continuously to transmit the requests and responses for the statistics. In a large scale deployment, where millions of such multi-part requests for statistics are being sent, the bandwidth requirement on the control network can be enormous.

SUMMARY

One general aspect includes a method, in a network controller of a software-defined networking (SDN) network coupled to a network device in a data plane of the SDN network, for autonomously relaying to the network controller statistics of one or more flows received at the network device. The method includes transmitting a message including a statistics profile, where the statistics profile includes a type of data to be collected associated with a behavior of a flow at the network device and a set of one or more criteria. The message including the statistics profile causes the network device to transmit a statistics message associated with one or more flows when the one or more flows satisfy at least one criterion from the set of one or more criteria, where the statistics message includes data collected at the network device associated with a behavior of the one or more flows as identified by the type of data to be collected included in the statistics profile.

One general aspect includes a network controller to be coupled to a network device of a data plane in a software-defined networking (SDN) network. The network controller includes a processor and a memory, said memory containing instructions executable by the processor where the network controller is operative to transmit a message including a statistics profile, where the statistics profile includes a type of data to be collected associated with a behavior of a flow at the network device and a set of one or more criteria; where the message including the statistics profile causes the network device to transmit a statistics message associated with one or more flows when the one or more flows satisfy at least one criterion from the set of one or more criteria, where the statistics message includes data collected at the network device associated with a behavior of the one or more flows as identified by the type of data to be collected included in the statistics profile.

One general aspect includes a method in a network device of a data plane coupled with a network controller in a software-defined networking (SDN) network. The method includes determining that at least one criterion from a set of one or more criteria included in a statistics profile is satisfied by a flow, where the statistics profile further includes a type of data to be collected associated with a behavior of the flow at the network device; and automatically transmitting to the network controller a statistics message, in response to determining that the at least one criterion is satisfied and without receiving a request from the network controller to transmit the statistics message, where the statistics message includes an identification of the flow and collected data associated with the behavior of the flow at the network device as identified by the type of data to be collected included in the statistics profile.

One general aspect includes a network device of a data plane to be coupled to a network controller in a software-defined networking (SDN) network. The network device includes a processor and a memory, said memory containing instructions executable by the processor where the network device is operative to determine that at least one criterion from a set of one or more criteria included in a statistics profile is satisfied by a flow, where the statistics profile further includes a type of data to be collected associated with a behavior of the flow at the network device; and to automatically transmit to the network controller a statistics message, in response to determining that the at least one criterion is satisfied and without the receipt of a request from the network controller to transmit the statistics message, where the statistics message includes an identification of the flow and collected data associated with the behavior of the flow at the network device as identified by the type of data to be collected included in the statistics profile.

BRIEF DESCRIPTION OF THE DRAWINGS

The invention may best be understood by referring to the following description and accompanying drawings that are used to illustrate embodiments of the invention. In the drawings:

FIG. 1 illustrates a method and system 100 for enabling autonomous relay of statistics of one or more flows from a network device to a network controller of an SDN network in accordance with some embodiments;

FIG. 2 illustrates a flow diagram of exemplary operations for causing the installation of a statistics profile in accordance with one embodiment;

FIG. 3 illustrates a flow diagram of exemplary operations for causing the modification of a statistics profile in accordance with one embodiment;

FIG. 6A illustrates an exemplary structure for implementing a statistics profile in accordance with some embodiments;

FIG. 6B-E illustrate exemplary fields to be included in a message including a statistics profile in accordance with some embodiments;

FIGS. 6F-I illustrate exemplary structures of messages for relaying statistics from a network device to a network controller of an SDN network in accordance with some embodiments;

FIG. 7A illustrates connectivity between network devices (NDs) within an exemplary network, as well as three exemplary implementations of the NDs, according to some embodiments of the invention;

FIG. 7B illustrates an exemplary way to implement a special-purpose network device according to some embodiments of the invention;

FIG. 7C illustrates various exemplary ways in which virtual network elements (VNEs) may be coupled according to some embodiments of the invention;

FIG. 7D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention;

FIG. 7E illustrates the simple case of where each of the NDs implements a single NE, but a centralized control plane has abstracted multiple of the NEs in different NDs into (to represent) a single NE in one of the virtual network(s), according to some embodiments of the invention;

FIG. 7F illustrates a case where multiple VNEs are implemented on different NDs and are coupled to each other, and where a centralized control plane has abstracted these multiple VNEs such that they appear as a single VNE within one of the virtual networks, according to some embodiments of the invention.

DESCRIPTION OF EMBODIMENTS

Figure 4A:
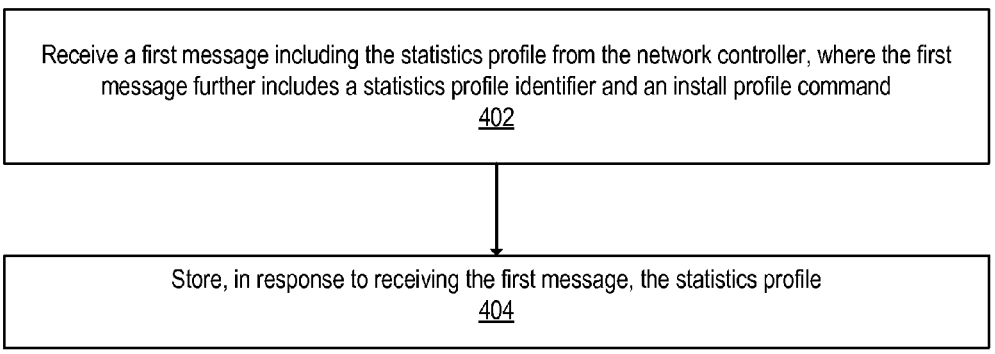
FIG. 4A illustrates a flow diagram of exemplary operations for installing a statistics profile in accordance with some embodiments.

The following description describes methods and apparatuses for autonomously relaying to the network controller statistics of one or more flows received at the network device in a data plane of an SDN network. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Software Defined Networking (SDN) is an approach to computer networking that allows network administrators to manage network services through abstraction of lower-level functionality. This is done by decoupling the system that makes decisions about where traffic is sent (the control plane) from the underlying systems that forward traffic to the selected destination (the data plane). In such a system, a network controller, which is typically deployed as a cluster of server nodes, has the role of the control plane and is coupled to one or more network elements that have the role of the data plane. Each network element may be implemented on one or multiple network devices. The control connection between the network controller and network elements is generally a TCP/UDP based communication. The network controller communicates with the network elements using an SDN protocol (e.g., OpenFlow, I2RS, etc.).

For implementing SDN, the Open Networking Foundation (ONF), an industrial consortium focusing on commercializing SDN and its underlying technologies, has defined a set of open commands, functions, and protocols. The defined protocol suites are known as the OpenFlow (OF) protocol. The network controller, acting as the control plane, may then program the data plane on the network elements by causing packet handling rules to be installed on the forwarding network elements using OF commands and messages. These packet handling rules may have criteria to match various packet types as well as actions that may be performed on those packets. The forwarding plane includes forwarding tables (e.g., flow tables, group tables) which may be distributed across multiple data-path network elements.

In a typical deployment, the SDN controller can collect real-time or near real-time statistics associated with the behavior of flows processed at the data plane. These statistics may be requested by overlaying applications and used to determine a state of the network. For example, the north bound applications may need to retrieve a byte count and a packet count for each flow processed at the data plane. The application may then determine: (1) whether these quantities (e.g., flow's packet/byte aggregate count) exceed a given threshold; (2) whether there is a burst in traffic during a given time window for a given flow; and/or (3) whether a flow has exceeded an allowed time-limit and should be considered an Elephant flow.

In a standard approach, in order to gather statistics associated with the behavior of a flow at network devices, the control plane (i.e., the network controller) sends requests to the different network devices. The network controller then receives responses from the network device including the requested statistics. These messages (requests/response) are used to gather flow statistics from the network devices. For example, if the control-plane requires collecting real-time statistics periodically for particular flows in the data plane, it has to periodically send multi-part request messages requesting the multiple network devices of the data-plane to provide the information for each of the flow-entries. For this purpose, the control network providing connectivity between the network controller and the forwarding network elements is used continuously to transmit the requests and responses for the statistics. With increase in scale, i.e., when there are thousands (if not millions) of forwarding network devices (e.g., switches), the amount of control messages exchanged between the control and the data-plane increases manifold. In such a large scale deployment, where millions of such multi-part requests for statistics are being sent, the bandwidth requirement on the control network can be enormous.

This approach has the additional limitation of requiring an increase in the amount of processing performed in the SDN controller to collect statistics data from all the data plane network devices and analyze the statistics data retrieved to determine flows whose threshold has been compromised.

In addition, standard approaches do not offer any autonomous alerting mechanism from the data plane that can be used by the control plane to determine bursty flows or elephant flows without the need of sending a request from the network controller to gather statistics from the network device.

The embodiments of the present invention present methods and apparatuses for using statistics profiles for configuring the network devices of the data plane to autonomously relay statistics associated with the behavior of flows without requiring the control plane to request the statistics. In some embodiments, a network device is configured to periodically report for one or more flows identified within the statistics profile statistics associated with the behavior of the flows at the network device. In additional embodiments, the network device is configured to report statistics associated with the behavior of one or more flows when the one or more flows satisfy at least one criterion from a set of one or more criteria. By enabling an autonomous relay of statistics without requiring the network controller to request the statistics, the embodiments presented herein provide clear advantages with respect to prior approaches. Thus, the use of the statistics profiles reduces the amount of messages (e.g., request/responses) being sent from/to the network controller as well as the amount of processing at the network controller. Further, the statistics profiles enable the transmission of batched aggregated alerts for multiple flows in a single autonomously transmitted message.

Methods in a network controller of an SDN network coupled to a network device in a data plane of the SDN network, for facilitating autonomous relay to the network controller of statistics of one or more flows received at the network device are hereby disclosed. The methods comprise transmitting a message including a statistics profile, wherein the statistics profile includes a type of data to be collected associated with a behavior of a flow at the network device and a set of one or more criteria; wherein the message including the statistics profile causes the network device to transmit a statistics message associated with one or more flows when the one or more flows satisfy at least one criterion from the set of one or more criteria, wherein the statistics message includes data collected at the network device associated with a behavior of the one or more flows as identified by the type of data to be collected included in the statistics profile. The message including the statistics profile may further include an install profile command. The receipt of the message may cause the network device to store the statistics profile. In an embodiment, the message including the statistics profile further includes a modify profile command and a set and a set of one or more packet match fields respectively identifying the one or more flows. The receipt of the message may cause the network device to update the statistics profile to include the set of one or more packet match fields; and the network device is to transmit the statistics message when the one or more flows, as identified based on the set of one or more packet match fields, satisfy the at least one criterion.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

FIG. 1 illustrates a method and system 100 for enabling autonomous relay of statistics of one or more flows from a network device to a network controller of an SDN network in accordance with some embodiments. In FIG. 1, the circled numbers are used to denote transactions performed by the elements in the system. The order/sequence of the transactions in FIG. 1 is shown for illustrative purposes, and is not intended to be limitations of the present invention. In one embodiment, the method may be performed by an OpenFlow enabled network element included in a network device (e.g., a router, a switch, or a bridge), although the scope of the invention is not so limited. As used herein, the term OpenFlow is intended to encompass future versions, future releases, improvements, and extensions to OpenFlow. Moreover, other embodiments are applicable to other protocols besides those that are extensions or derivations of OpenFlow, where a network device is operative to be programmed using flow profiles.

System 100 includes a software-defined networking (SDN) network represented by network controller (NC) 110 and network device (ND) 120 (which may also be referred herein as a forwarding network device). Although the SDN network may include additional NDs controlled by NC 110, they are not shown here for ease of understanding. Thus when the description below refers to ND 120, one can assume that the description may also be referring to additional NDs in the SDN network that are controlled by NC 110. In some embodiments, the network device 120 is a physical device implementing a logical network element or a portion of the network element. In some embodiments, a network element can be implemented on multiple network devices. For ease of understanding, the embodiments described below refer to the connection and communication established between the network controller and the network device. However, one would understand that this may represent a communication between the network controller and the network element including the networking functionality (e.g., router, bridge, or switch).

In the illustrated embodiment, the network controller 110 acts as the control plane and the NDs, including ND 120, act as the data plane. The control plane in the SDN network communicates with the network devices implementing the data plane using an SDN communications protocol (e.g., OpenFlow, defined by the Open Networking Foundation). The network controller may be implemented on one or more network devices. The structure of the network devices is described in further details in reference to FIGS. 7A-D and 8.

An SDN network provides a network administrator with a centrally managed control plane (e.g., the network controller 110) and may simplify management and reduce costs. Unlike a traditional network device where the control plane and data plane reside on one device, separating the control plane and data plane means that control plane and data plane devices are now communicatively coupled using a link, such as link 150. This may introduce additional latencies, bandwidth limitations, and disconnection/connection limitations. Applications running north bound of the network controller may request the collection of statistics regarding the behavior of flows within the data plane. The embodiments described with reference to the operations of the circles 1-4 enable the autonomous relay of statistics from the network device to the network controller.

At circle 1, the network controller 110 transmits (114) a message including a statistics profile, wherein the statistics profile includes a type of data to be collected associated with a behavior of a flow at the network device and a set of one or more criteria. The transmitted message causes the network device 120 to transmit a statistics message associated with one or more flows when the one or more flows satisfy at least one criterion from the set of one or more criteria. The statistics message includes data collected at the network device associated with the behavior of the one or more flows as identified by the type of data to be collected included in the statistics profile.

In one embodiment, the message (141) including the statistics profile further includes an install profile command and the network controller transmits this message (circle 2a) to instruct the network device to install the statistics profile. FIG. 2 illustrates a flow diagram 200 of exemplary operations for causing the installation of a statistics profile in accordance with one embodiment. At block 202, the network controller 110 constructs the message including a statistics profile (e.g., the message can be an OpenFlow message as will be described in further detail with reference to FIGS. 6A-E). The statistics profile includes a type of data to be collected associated with a behavior of a flow at the network device and a set of one or more criteria. The type of data to be collected can include a number of packets received at the network device for a flow, a number of packets received at the network device for a flow during a predetermined period of time, a period of time during which packets of a flow are received at the network device, and/or a number of flows included in a forwarding table. The set of criteria includes one or more threshold values related to the type of data collected. For example, the set of criteria may include an aggregate threshold value, a burst threshold value, a time threshold value, and a threshold flow count as will be described with further detail with reference to FIGS. 5A-5B.

Flow then moves to block 204, at which the network controller 110 transmits the message including the statistics profile and an install profile command. The message causes (at block 206) the network device to store the statistics profile in response to receiving the install profile command. The statistics profile is stored at the network device as one of the profiles from the set of statistics profiles 132. The network device 120 may be configured to include one or more statistics profiles. Each profile from the set 132 includes a profile identifier, a type of data to be collected associated with the behavior of a flow at the network device, and a set of one or more criteria that causes the network device to transmit a statistics message upon detection that at least one of the criteria is satisfied. The statistics profile may further include a list of match criteria for identifying flows for which the profile applies. In one embodiment, the network controller 110 transmits a first message for installing the statistics profile without including the match criteria for identifying flows. In this embodiment, the statistics profile is installed without specifying which flows should be monitored or should transmit statistics messages (e.g., the statistics profile may be installed prior to the installation of the flows and their configuration at the forwarding tables 130 of the network devices). In another embodiment, the statistics profile may be installed with a first set of match criteria identifying a first set of flows to which the statistics profile is to be applied. When the statistics profile is installed with the first set of match criteria, network device 120 is immediately operative to transmit statistics messages to the network controller 110 for a flow when the flow satisfies one of the criteria of the statistics profile.

FIG. 4A illustrates a flow diagram 400A of exemplary operations for installing a statistics profile in accordance with some embodiments. At operation 402, the network device 120 receives a first message including the statistics profile from the network controller (message 141). The statistics profile includes a type of data to be collected associated with a behavior of a flow at the network device and a set of one or more criteria, and the message further includes a profile identifier and an install profile command. Upon receipt of this message, the network device stores the statistics profile as part of the set of statistics profiles 132. The statistics profile may further include a list of match criteria for identifying flows for which the profile applies. In one embodiment, the network device 120 receives this message as a first message used to instruct the network device to install the statistics profile without identifying any flows for which the statistics profile is to be applied (e.g., the statistics profile may be installed prior to the installation of the flows and their configuration at the forwarding tables of the network device 120). In this embodiment, the network device receives at a later stage another message for modifying the statistics profile, which will identify the flows. In another embodiment, the message includes an identification of the flow and the statistics profile may be installed with a first set of match criteria identifying a first set of flows to which the statistics profile is to be applied. When the statistics profile is installed with the first set of match criteria, the network device 120 is immediately operative to transmit statistics messages to the network controller 110 for a flow when the flow satisfies one of the criteria of the statistics profile without the need for receiving an additional message from the network controller 110.

Referring back to FIG. 1, in another embodiment, the message (142) including the statistics profile further includes a modify profile command instead of an install profile command, and the network controller transmits this message (circle 2b) to instruct the network device to modify a statistics profile that has previously been installed (as described above with reference to FIGS. 1 and 2). Thus in some embodiments, the network controller transmits a first message to install the statistics profile and transmits a second message to modify the installed statistics profile such that this profile is applied to flows specified in the second message. FIG. 3 illustrates a flow diagram 300 of exemplary operations for causing the modification of a statistics profile in accordance with one embodiment. At block 302, the network controller 110 constructs a message including a statistics profile, a modify profile command, and a set of one or more packet match fields respectively identifying the one or more flows. In an embodiment, the message includes an identifier of a statistics profile that was previously installed at the network device and which was stored as one of the statistics profiles from the set 132. The identifier is used to access the set of statistics profile 132 and retrieve the corresponding statistics profile. The statistics profile, which is retrieved based on the profile identifier, includes a type of data to be collected associated with a behavior of a flow at the network device and a set of one or more criteria. The network controller 110 then transmits (at block 304) the message including the statistics profile identifier, the modify profile command, and the set of one or more packet match fields respectively identifying the one or more flows. The receipt of the message causes (at block 306) the network device 120 to update one of the statistics profiles previously installed to include the set of one or more packet match fields. This message is used to specify a set of flows for which the statistics profile is to be applied and causes the network device to transmit (at block 308) a statistics message associated with those flows when they satisfy at least one criterion from the set of criteria of the statistics profile. The flows are identified based on the set of one or more packet match fields.

Figure 4B:
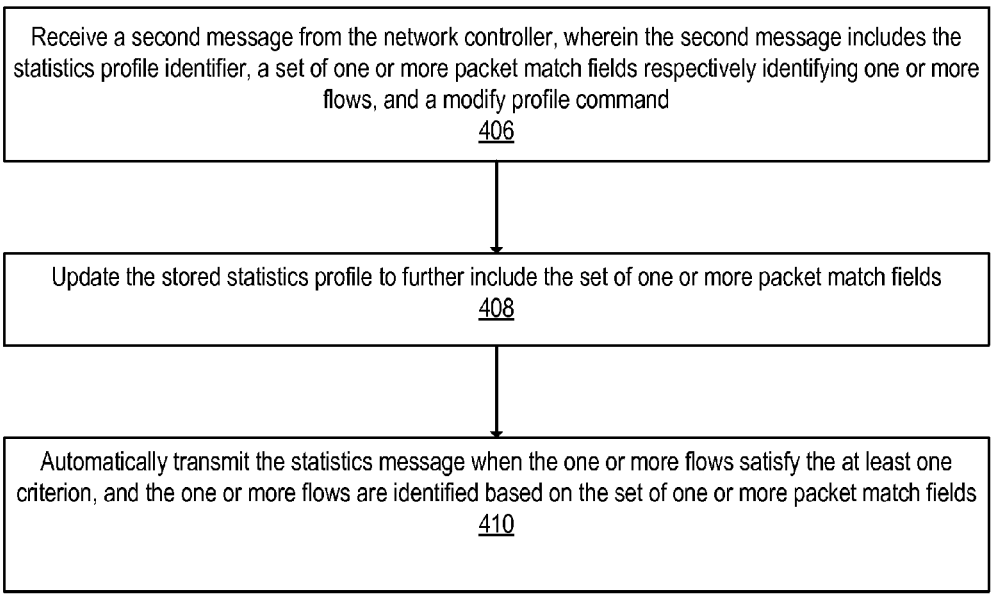
FIG. 4B illustrates a flow diagram of exemplary operations for modifying a statistics profile in accordance with some embodiments.

FIG. 4B illustrates a flow diagram 400B of exemplary operations for modifying a statistics profile in accordance with some embodiments. In one embodiment, following the installation of the statistics profile, the network device 120 receives (at block 406) a second message from the network controller 110, which includes the statistics profile identifier, a set of one or more packet match fields respectively identifying one or more flows, and a modify profile command. Flow moves to block 408 at which the network device 120 updates a previously stored statistics profile to further include the set of one or more packet match fields. In some embodiments, the update of the flows may cause some flows to be removed from the statistics profile, while others are added to the statistics profile. Thus the statistics profile is updated to be applied to any one of the flows which is identified by one of the packet match fields. Flow then moves to block 410, at which the network device 120 automatically transmits the statistics message when the one or more flows, as identified based on the set of one or more packet match field, satisfy the at least one criterion from the set of criteria of the statistics profile.

Referring back to FIG. 1, following the installation of a statistics profile as well as the identification of one or more flows for which the statistics is to be applied, at circle 3, the network device 120 determines that at least one criterion from a set of one or more criteria included in a statistics profile is satisfied by a flow (block 122). At circle 4 (block 124), the network device 120 automatically transmits to the network controller 110 a statistics message, in response to determining that the at least one criterion is satisfied and without the receipt of a request from the network controller to transmit the statistics message. The statistics message includes an identification of the flow and collected data associated with the behavior of the flow within the network device as identified by the type of data to be collected included in the statistics profile.

Figure 5A:
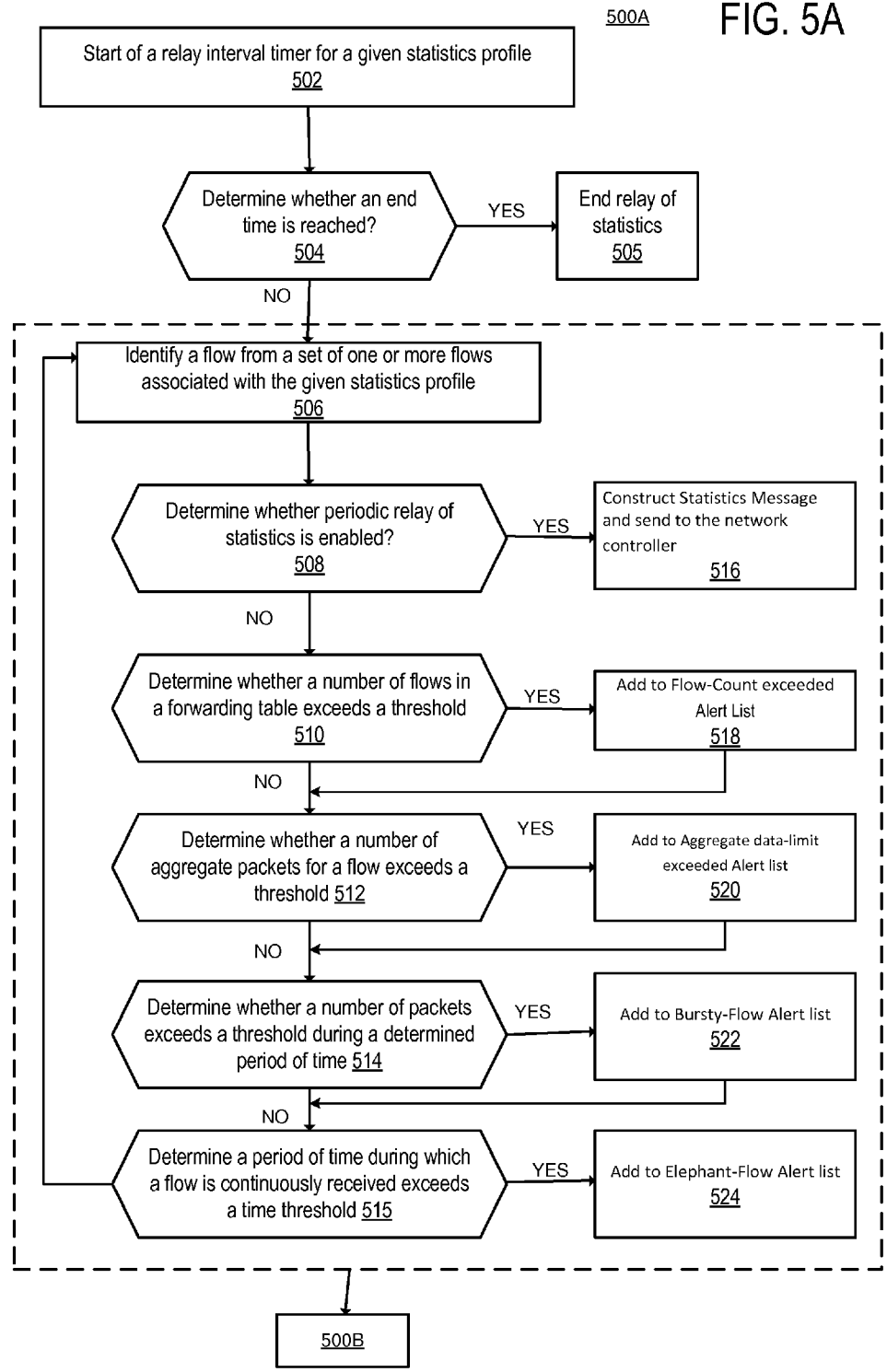
FIGS. 5A-B illustrate flow diagrams of exemplary operations for determining whether at least one criterion is satisfied at the network device causing the transmission of a statistics message to the network controller in accordance with some embodiments.
Figure 5B:
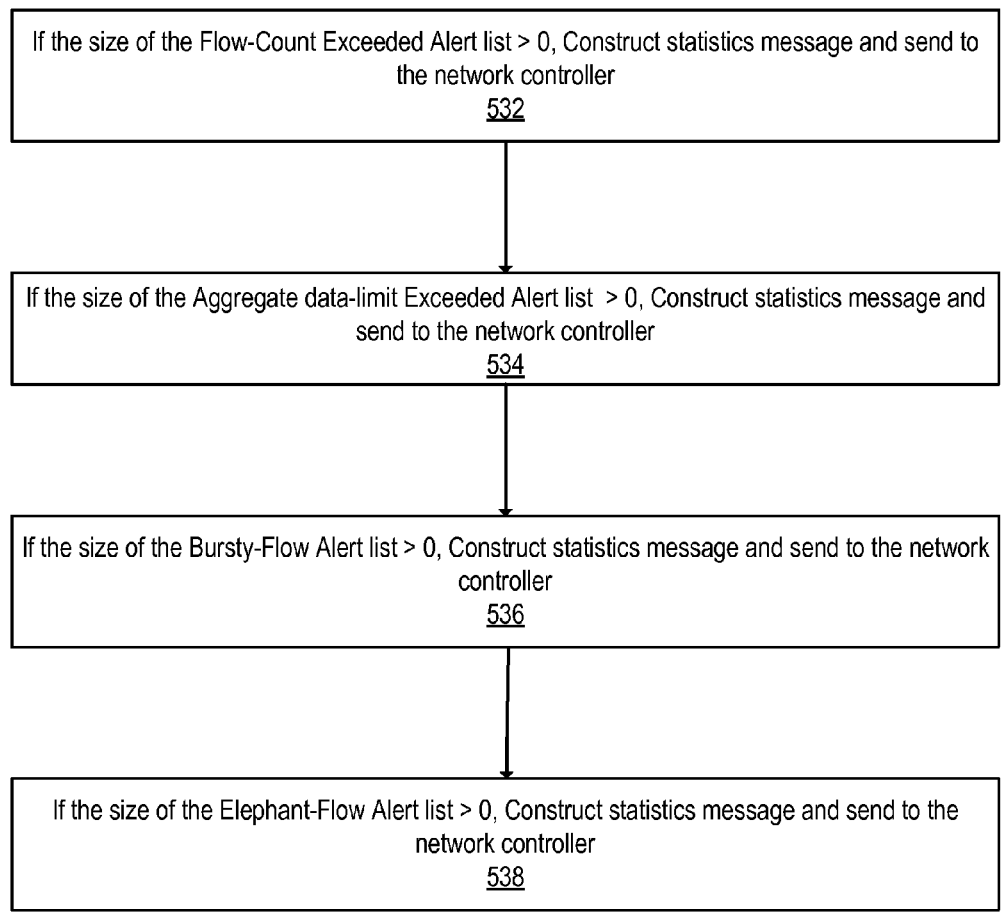

FIGS. 5A-B illustrate flow diagrams 500A and 500B of exemplary operations for determining whether at least one criterion is satisfied at the network device causing the transmission of a statistics message to the network controller in accordance with some embodiments. Following the installation of one or more statistics profiles where each profile is associated with flows, the network device maintains data representative of the behavior of each flow at the network device. The data is monitored (e.g., periodically) to determine whether a criterion from a statistics profile is satisfied causing the transmission of a statistics message including the data.

At block 502 of flow diagram 500A, the network device 120 starts a relay interval timer for a given statistics profile. The relay interval delimits an interval of time at which the network device is to verify whether any of the criteria of the given statistics profile is satisfied. In some embodiments, the relay interval is an interval of time at which a statistics thread is to wake-up and analyze the data collected for each flow and determine whether statistics messages are to be sent to the network controller. Flow then moves to block 504 at which the network device determines whether an end time is reached. If the end time is reached, this indicates that the statistics relay process is to be ended and flow moves to block 505 at which the statistics relay is stopped. If the end time is not reached, flow moves to block 506. At block 506, the network device 120 identifies a first flow from the set of one or more flows associated with the given statistics profile. Flow then moves to block 508 at which the network device determines whether periodic relay of statistics is enabled. In one embodiment, periodic relay of statistics is enabled if the statistics profile installed at the network device indicates that data is to be collected and transmitted to the network controller periodically for one or more flows. If periodic relay is enabled, the network device 120 constructs a statistics message and sends the message to the network controller 110 at block 516. The statistics message may include data associated with the behavior of the flow at the network device. In a non-limiting exemplary embodiment, the data can include a count of the number of packets received at the network device for the flow, a number of bytes received at the network device for the flow, a number of packets/bytes received at the network device during a predetermined period of time for that flow, etc.

If periodic relay is not enabled, the flow of operations then moves to block 510 at which the network device determines whether a number of flows in a forwarding table exceeds a threshold value. If the number of flows in the forwarding table exceeds the threshold, the flow of operations moves to block 518 and the table identifier is added to a list: "Flow-Count exceeded Alert List." The flow-count exceeded alert list includes identifiers of all forwarding tables which have exceeded a number of flows threshold value. The flow of operations then moves from block 518 to block 512. In addition, when the number of flows in the forwarding table does not exceed the threshold, flow moves from block 510 to block 512. At block 512, the network device 120 determines for a given flow whether a number of aggregate packets exceeds an aggregate threshold value. If the aggregate threshold value is exceeded, an identifier of the flow is added (block 520) to an "aggregate data-limit exceeded alert list." The aggregate data-limit exceeded alert list includes a list of flows added during the relay statistics process for which the total number of packets/bytes received at the network device (i.e., aggregate packet count, or aggregate byte count) exceeded a threshold value. Flow then moves from block 520 to block 514. In addition, when the aggregate threshold value is not exceeded, flow moves from block 512 to block 514. At block 514, the network device 120 determines whether a number of packets (or bytes) exceeds a threshold during a determined period of time. If the number of packets/bytes of the flow exceeds the threshold during the predetermined period of time, an identifier of the flow is added to a "bursty-flow alert list" at block 522. Flow then moves from block 522 to block 515. In addition, when the number of packets/bytes of the flow does not exceed the threshold during the predetermined period of time, flow moves from block 514 to block 515. At block 515, the network device determines a period of time during which the flow is continuously received exceeds a time threshold. When the flow is determined to be continuously received at the network device for a period of time higher than the time threshold, an identifier of the flow is added to an "elephant-flow alert list" at block 524. The process then repeats for all flows associated with the statistics profile which is being processed until all flows identified in the statistics profile have been processed.

The flow of operations then moves to blocks of flow diagram 500B of FIG. 5B. At block 532 of flow diagram 500B, the network device 120 determines if the size of the Flow-Count Exceeded Alert list is higher than 0 (i.e., if there is at least a forwarding table at the network device which includes a number of flows that exceeded a threshold). If the size is higher than zero then the network device constructs a statistics message and sends the message to the network controller. The statistics message includes the number of flows of the forwarding table and may include additional statistics data related to the forwarding table and/or to the flows of the forwarding table. Flow then moves to block 534, at which the network device 120 determines if the size of the Aggregate data-limit Exceeded Alert list is higher than zero (i.e., if there is at least one flow which has a number of aggregate packets or bytes that are higher than a threshold value). If the size is higher than zero then the network device 120 constructs a statistics message and sends the message to the network controller. The message includes the number of aggregate packets or bytes for the flow and may additionally include other statistics associated with the flow or with other flows processed at the network device 120. The flow of operations then moves to block 536 at which the network device 120 determines if the size of the Bursty-Flow Alert list is higher than zero (i.e., if there is at least one bursty flow for which a number of packets received at the network device during a given period of time is higher than a threshold). If the size is higher than zero, the network device 120 constructs a statistics message and sends the message to the network controller. The flow of operations then moves to block 538 at which the network device determines if the size of the Elephant-Flow Alert list is higher than zero (i.e., if there is at least one elephant flow which is received at the network device during a period of time exceeding a time threshold). If the size is higher than zero, the network device 120 constructs a statistics message and sends the message to the network controller.

While embodiments of FIG. 5A have been described in relation to a given statistics profile, the operations of the flow diagram are repeated for each statistics profile installed at the network device. A statistics relay process is performed for each statistics profile installed and based on the one or more criteria of the statistics profile. In one embodiment, the criteria included in the statistics profile define values to the threshold used for identifying bursty flows, elephant flows or large flows.

FIG. 6A illustrates an exemplary structure 600A for implementing a statistics profile in accordance with some embodiments. In some embodiments, the statistics profile can be implemented as an experimenter (i.e., an extension) of the OpenFlow protocol. While the embodiments presented herein will be described with reference to the OpenFlow protocol, the invention is not so limited, as other protocols may be used. The structure 600A of FIG. 6A illustrates an exemplary message structure "a_msg_stat_profile" including the fields 602-634. This structure may be used to create the first message (i.e., message 141 of FIG. 1) including the statistics profile installation command as well as the second message (i.e., message 142 of FIG. 1) including the statistics profile modification command. In addition, the present structure may be used to remove a statistics profile previously installed at the network device. The elements of the structure 600A will be described in further detail below with reference to the exemplary structures and fields presented in FIGS. 6B-E. FIGS. 6B-E illustrate exemplary fields to be included in a message including a statistics profile in accordance with some embodiments.

In some embodiments, the OpenFlow extension is identified based on an experimenter identification (ID) (604) (e.g., in an exemplary embodiment A_EXPERIMENTER_ID may be assigned a value of "0x00D0F0DB," however the embodiments are not so limited and the experimenter_ID may be assigned another value). The message "a_msg_stat_profile" is identified according to a message type and may be one of the four message types as presented in the example below:

```
enum a_msg{
A_MSG_STAT_PROFILE=2001/*statistics profile message*/
A_MSG_STAT_ALERT=2002/*Statistics-Alert Message*/
A_MSG_FLOW_LIMIT_ALERT=2003/*Flow-Limit Alert Message*/
A_MSG_STATS_FLOW_INFO=2004/*Stats Flow Message*/
};
```

The a_msg_stat_profile message is used by the network controller 110 to install a statistics profile at the network device 120. In some embodiments, the same structure 600A is used to construct the first and the second message for respectively installing a statistics profile and modifying the statistics profile at the network device. The message may further be used to remove a statistics profile. Although only one exemplary structure is presented for constructing the first and the second message, one would understand that the invention is not so limited and that in some embodiments, a first structure may be used to construct the first message and a different structure may be used to construct the second message.

The message includes an "ofp_header" 602 which is a header as per the OpenFlow specification. The message further includes a "commandType" (608) field of type "a_stat_profile_cmd_type" used to determine if the command is used to install a statistics profile or a flow or both. FIG. 6B illustrates a structure 600B of exemplary command types to be included in a message including a statistics profile in accordance with some embodiments. When "A_SPCT_PROFILE_CREATE" (636) is used, only the statistics profile is installed at the OpenFlow Agent of the network device 120. When "A_SPCT_PROFILE_MODIFY" (638) is used, the statistics profile is modified. To remove a statistics profile, "A_SPCT_PROFILE_REMOVE" (640) command type is used.

Each statistics profile is identified with a key 610 "ProfileId" included in the message. This profileId is used to store and retrieve the statistics profile from the set of statistics profiles 132. The message may further include a "monitorStartTime" (612) and "monitorEndTime" (614) which indicate the time during which the statistics profile is active at the network device (i.e., the timer thread is running for this statistics profile). In some embodiments, the start time and end time of the statistics profile are specified in seconds. The end time "monitorEndTime" is used to determine when the relay statistics process is to be stopped. For example, the end time is used at block 504 in FIG. 5A to determine whether the end of the process is reached. These fields can be modified using a modify command and the statistics profile can be made active again. The "relayInterval" (618) is the time interval at which the statistics profile's timer thread will wake up. The "profileFlags" (616) field is a bit indicating whether the periodic relay of the statistics is enabled. For example, when the "profileFlags" is set to a bit "0," this indicates that the periodic relay of statistics is enabled, and the network device will transmit to the network controller a set of statistics related to the flows associated with the statistics profile every relay interval. In other embodiments, when the "profileFlags" is set to a bit "1," this indicates that the periodic relay of statistics is enabled. According to one embodiment, the "aggreagate_data_limit" field, "burst_level" field, and "ele_flow_tolerance" field are example of criteria included in the statistics profile which cause the transmission of a statistics message from the network device to the network controller. The "aggregate_data_limit" field (620) is the data-limit in bytes which should not be exceeded for the identified flows. The "burst_level" field (622) is the number of packets/bytes which should not be exceeded within a single "relayInterval" for the identified flows. The "ele_flow_tolerance" field (624) is the time (e.g., in seconds) for which a flow can exist in the system beyond which it will be considered as an elephant flow. The "flow_limit_info_list" field (628) provides the list of forwarding tables to check for the specified flow limit. In some embodiments, the "flow_limit_info_list" is of type "a_flow_limit_info" as defined with respect to the exemplary structure 600C of FIG. 6C and includes a table_id 642 (identifying the table to be checked) and a "flow_limit" field 644 (identifying the threshold number of flows). The "total_flow_limit_info_len" (626) field indicates the size of the list. The "flow_match_info_list" field (634) contains the list of flow-references (i.e., the match field that identifies the flows associated with the statistics profile) that need to be monitored as part of this statistics profile. The "a_ofp_match_info" structure (600D) of FIG. 6D can be used to specify the forwarding table identifier along with the flows associated with the forwarding table. The flows are identified based on the match fields (656), and the forwarding table is identified based on the "table_id" field (650).

The "mod_mode" field (652) of the structure (600D) can be used to indicate the mode of modification, which can be one of "merge" (658), "replace" (660), or "remove" (662) as specified in the exemplary structure 600E for "enum a_flow-ref_mod_mode" of FIG. 6E. The "total_match_info_len" field (630) indicates the size of the "flow_limit_info_list" list.

Thus, the structures and fields of FIGS. 6A-6E are used to install/modify/remove a statistics profile as well as flows associated with a statistics profile. FIGS. 6F-I illustrate exemplary structures of messages for relaying statistics from a network device to a network controller of an SDN network in accordance with some embodiments. FIG. 6F illustrates an exemplary structure 600F of a message for transmitting statistics to the network controller when one of a bursty flow, an elephant flow or an aggregate number of packets exceeding a threshold is detected at the network device. The type of alerts (i.e., bursty flow, elephant, or aggregate number of packets exceeding a threshold) is identified according to one of the types as identified in the structure 600G of FIG. 6G. The statistics message of structure 600F includes a profile identifier "profileId" field (678), the list of flows that caused the generation of the message (i.e., "flow_match_info_list" (690) which includes a set of match fields identifying the flows).

The network device may further transmit a statistics message upon detection that a number of flows in a forwarding table has exceeded a predetermined threshold. In some embodiments, this message is constructed according the structure 600H of FIG. 6H. The network device may further transmit a statistics message periodically according to a statistics profile. In this embodiment, the statistics message is constructed according to the structure 600I of FIG. 6I. The statistics message may include "uint64_t packet_count" (720) which includes the number of packets in a flow; "uint64_t byte_count" (722) which includes the number of bytes in a flows; "uint32_t flow_count" (724), which includes the number of flows; and "struct eric_ofp_match_info matchInfo[ ]" (728) which indicates the identification of the flows.

The embodiments described herein present a method and apparatus for autonomously relaying statistics associated with the behavior of flows at network devices without receiving requests from the network controller. Thus, according to these embodiments, a statistics profile is installed at the network device which causes the network device to transmit one or more statistics messages to the network controller without receiving any requests from the network controller. The statistics message is transmitted upon determination that at least one criterion of the statistics profile is satisfied by one or more flows at the network device.

Thus, contrary to prior approaches in which North bound applications retrieve statistics periodically and process the data retrieved to identify if there is an anomaly (such as an aggregate data-limit exceeded/a bursty-flow/an elephant-flow) in the network, the proposed embodiments enable the North bound applications to automatically receive statistics information from a network device only when some criteria (e.g., a bursty flow is detected, an elephant flow is detected, etc.) are satisfied. This reduces the bandwidth usage in the control network, as well as the amount of processing that needs to be performed in the network controller. Also, if the requirement is to detect anomalies in real-time/near real-time, it decreases the processing load and algorithm complexity.

The present embodiments further enable batched/aggregated alerts for multiple flows in a single autonomously transmitted message.

Bursty-Flow alerts on flows in a given data-path node or a set of nodes can indicate presence of congestion in those paths, and the network controller can take appropriate action based on that. On receiving Elephant-Flow alerts from multiple data-path nodes, the network controller can determine if flows of certain subscriber(s) are hogging the network. Since the network controller is centralized with a full network view, all the elephant-flow alerts from different data-path network devices can be correlated and appropriate action can be taken if needed.

Applications that intend to collect statistics for purpose other than detecting the above anomalies can use the proposed method to improve the bandwidth usage and optimize processing work load. For example, for a given flow, instead of collecting statistics in periodic intervals, the application can specify an aggregate data-limit and can get the alert when this aggregate data-limit is exceeded. On receiving an aggregate data-limit exceeded alert for a given flow, the application can update the profile with a further increased aggregate data-limit value so that it can follow the pattern of increase in data usage for the flow in a controlled manner by receiving data-limit exceeded alerts. Thus, instead of getting all statistics periodically, aggregate data-limit exceeded alerts can be obtained only when specific thresholds are exceeded and correlated appropriately.

For applications that still need to retrieve statistics periodically, the bit 0 of the profileFlags (616) field of structure 600A can be set to 1 so that, at every relay-interval, the statistics will be sent to the network controller. However in this embodiment, the statistics requests do not need to be sent to the network controller resulting in a reduction of traffic at the control network.

Architecture:

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

FIG. 7A illustrates connectivity between network devices (NDs) within an exemplary network, as well as three exemplary implementations of the NDs, according to some embodiments of the invention. FIG. 7A shows NDs 700A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 700A, E, and F illustrates that these NDs act as ingress and egress points for the network (and thus, these NDs are sometimes referred to as edge NDs; while the other NDs may be called core NDs).

Two of the exemplary ND implementations in FIG. 7A are: 1) a special-purpose network device 702 that uses custom application-specific integrated-circuits (ASICs) and a proprietary operating system (OS); and 2) a general purpose network device 704 that uses common off-the-shelf (COTS) processors and a standard OS.

The special-purpose network device 702 includes networking hardware 710 comprising compute resource(s) 712 (which typically include a set of one or more processors), forwarding resource(s) 714 (which typically include one or more ASICs and/or network processors), and physical network interfaces (NIs) 716 (sometimes called physical ports), as well as non-transitory machine readable storage media 718 having stored therein networking software 720. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 700A-H. During operation, the networking software 720 may be executed by the networking hardware 710 to instantiate a set of one or more networking software instance(s) 722. Each of the networking software instance(s) 722, and that part of the networking hardware 710 that executes that network software instance (be it hardware dedicated to that networking software instance and/or time slices of hardware temporally shared by that networking software instance with others of the networking software instance(s) 722), form a separate virtual network element 730A-R. Each of the virtual network element(s) (VNEs) 730A-R includes a control communication and configuration module 732A-R (sometimes referred to as a local control module or control communication module) and forwarding table(s) 734A-R, such that a given virtual network element (e.g., 730A) includes the control communication and configuration module (e.g., 732A), a set of one or more forwarding table(s) (e.g., 734A), and that portion of the networking hardware 710 that executes the virtual network element (e.g., 730A). In an embodiment, the ND 702 implements a network device as defined with regards to the FIGS. 1-6I and the networking software 720 includes a statistics profile module (SPM) 721. The SPM 721 enables the network device to receive a message from the network controller to install/modify a statistics profile and to transmit a statistics message in response to the installation of the statistics profile and the detection that at least one criterion from the statistics profile is satisfied as described with reference to FIGS. 1-6I. In an embodiment each of the control communication and configuration module 732A-R includes a respective SPM instance 733A-R.

The special-purpose network device 702 is often physically and/or logically considered to include: 1) a ND control plane 724 (sometimes referred to as a control plane) comprising the compute resource(s) 712 that execute the control communication and configuration module(s) 732A-R; and 2) a ND forwarding plane 726 (sometimes referred to as a forwarding plane, a data plane, or a media plane) comprising the forwarding resource(s) 714 that utilize the forwarding table(s) 734A-R and the physical NIs 716. By way of example, where the ND is a router (or is implementing routing functionality), the ND control plane 724 (the compute resource(s) 712 executing the control communication and configuration module(s) 732A-R) is typically responsible for participating in controlling how data (e.g., packets) is to be routed (e.g., the next hop for the data and the outgoing physical NI for that data) and storing that routing information in the forwarding table(s) 734A-R, and the ND forwarding plane 726 is responsible for receiving that data on the physical NIs 716 and forwarding that data out the appropriate ones of the physical NIs 716 based on the forwarding table(s) 734A-R.

FIG. 7B illustrates an exemplary way to implement the special-purpose network device 702 according to some embodiments of the invention. FIG. 7B shows a special-purpose network device including cards 738 (typically hot pluggable). While in some embodiments the cards 738 are of two types (one or more that operate as the ND forwarding plane 726 (sometimes called line cards), and one or more that operate to implement the ND control plane 724 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 736 (e.g., a first full mesh coupling the line cards and a second full mesh coupling all of the cards).

Returning to FIG. 7A, the general purpose network device 704 includes hardware 740 comprising a set of one or more processor(s) 742 (which are often COTS processors) and network interface controller(s) 744 (NICs; also known as network interface cards) (which include physical NIs 746), as well as non-transitory machine readable storage media 748 having stored therein software 750. During operation, the processor(s) 742 execute the software 750 to instantiate one or more sets of one or more applications 764A-R. While one embodiment does not implement virtualization, alternative embodiments may use different forms of virtualization—represented by a virtualization layer 754 and software containers 762A-R. For example, one such alternative embodiment implements operating system-level virtualization, in which case the virtualization layer 754 represents the kernel of an operating system (or a shim executing on a base operating system) that allows for the creation of multiple software containers 762A-R that may each be used to execute one of the sets of applications 764A-R. In this embodiment, the multiple software containers 762A-R (also called virtualization engines, virtual private servers, or jails) are each a user space instance (typically a virtual memory space); these user space instances are separate from each other and separate from the kernel space in which the operating system is run; the set of applications running in a given user space, unless explicitly allowed, cannot access the memory of the other processes. Another such alternative embodiment implements full virtualization, in which case: 1) the virtualization layer 754 represents a hypervisor (sometimes referred to as a virtual machine monitor (VMM)) or a hypervisor executing on top of a host operating system; and 2) the software containers 762A-R each represent a tightly isolated form of software container called a virtual machine that is run by the hypervisor and may include a guest operating system. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications 764A-R, as well as the virtualization layer 754 and software containers 762A-R if implemented, are collectively referred to as software instance(s) 752. Each set of applications 764A-R, corresponding software container 762A-R if implemented, and that part of the hardware 740 that executes them (be it hardware dedicated to that execution and/or time slices of hardware temporally shared by software containers 762A-R), forms a separate virtual network element(s) 760A-R. In an embodiment, the ND 704 implements a network device as defined with regards to the FIGS. 1-6I and the networking software 750 includes a statistics profile module (SPM) 751. The SPM 751 enables the network device to receive a message from the network controller to install/modify a statistics profile and to transmit a statistics message in response to the installation of the statistics profile and the detection that at least one criterion from the statistics profile is satisfied as described with reference to FIGS. 1-6I.

The virtual network element(s) 760A-R perform similar functionality to the virtual network element(s) 730A-R— e.g., similar to the control communication and configuration module(s) 732A and forwarding table(s) 734A (this virtualization of the hardware 740 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the software container(s) 762A-R differently. For example, while embodiments of the invention are illustrated with each software container 762A-R corresponding to one VNE 760A-R, alternative embodiments may implement this correspondence at a finer level granularity (e.g., line card virtual machines virtualize line cards, control card virtual machine virtualize control cards, etc.); it should be understood that the techniques described herein with reference to a correspondence of software containers 762A-R to VNEs also apply to embodiments where such a finer level of granularity is used.

In certain embodiments, the virtualization layer 754 includes a virtual switch that provides similar forwarding services as a physical Ethernet switch. Specifically, this virtual switch forwards traffic between software containers 762A-R and the NIC(s) 744, as well as optionally between the software containers 762A-R; in addition, this virtual switch may enforce network isolation between the VNEs 760A-R that by policy are not permitted to communicate with each other (e.g., by honoring virtual local area networks (VLANs)).

The third exemplary ND implementation in FIG. 7A is a hybrid network device 706, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 702) could provide for para-virtualization to the networking hardware present in the hybrid network device 706.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 730A-R, VNEs 760A-R, and those in the hybrid network device 706) receives data on the physical NIs (e.g., 716, 746) and forwards that data out the appropriate ones of the physical NIs (e.g., 716, 746). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317).

FIG. 7C illustrates various exemplary ways in which VNEs may be coupled according to some embodiments of the invention. FIG. 7C shows VNEs 770A.1-770A.P (and optionally VNEs 770A.Q-770A.R) implemented in ND 700A and VNE 770H.1 in ND 700H. In FIG. 7C, VNEs 770A.1-P are separate from each other in the sense that they can receive packets from outside ND 700A and forward packets outside of ND 700A; VNE 770A.1 is coupled with VNE 770H.1, and thus they communicate packets between their respective NDs; VNE 770A.2-770A.3 may optionally forward packets between themselves without forwarding them outside of the ND 700A; and VNE 770A.P may optionally be the first in a chain of VNEs that includes VNE 770A.Q followed by VNE 770A.R (this is sometimes referred to as dynamic service chaining, where each of the VNEs in the series of VNEs provides a different service— e.g., one or more layer 4-7 network services). While FIG. 7C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 7A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 7A may also host one or more such servers (e.g., in the case of the general purpose network device 704, one or more of the software containers 762A-R may operate as servers; the same would be true for the hybrid network device 706; in the case of the special-purpose network device 702, one or more such servers could also be run on a virtualization layer executed by the compute resource(s) 712); in which case the servers are said to be co-located with the VNEs of that ND.

A virtual network is a logical abstraction of a physical network (such as that in FIG. 7A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN RFC 4364) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

FIG. 7D illustrates a network with a single network element on each of the NDs of FIG. 7A, and within this straight forward approach contrasts a traditional distributed approach (commonly used by traditional routers) with a centralized approach for maintaining reachability and forwarding information (also called network control), according to some embodiments of the invention. Specifically, FIG. 7D illustrates network elements (NEs) 770A-H with the same connectivity as the NDs 700A-H of FIG. 7A.

FIG. 7D illustrates that the distributed approach 772 distributes responsibility for generating the reachability and forwarding information across the NEs 770A-H; in other words, the process of neighbor discovery and topology discovery is distributed.

For example, where the special-purpose network device 702 is used, the control communication and configuration module(s) 732A-R of the ND control plane 724 typically include a reachability and forwarding information module to implement one or more routing protocols (e.g., an exterior gateway protocol such as Border Gateway Protocol (BGP) (RFC 4271), Interior Gateway Protocol(s) (IGP) (e.g., Open Shortest Path First (OSPF) (RFC 2328 and 5340), Intermediate System to Intermediate System (IS-IS) (RFC 1142), Routing Information Protocol (RIP) (version 1 RFC 1058, version 2 RFC 2453, and next generation RFC 2080)), Label Distribution Protocol (LDP) (RFC 5036), Resource Reservation Protocol (RSVP) (RFC 2205, 2210, 2211, 2212, as well as RSVP-Traffic Engineering (TE): Extensions to RSVP for LSP Tunnels RFC 3209, Generalized Multi-Protocol Label Switching (GMPLS) Signaling RSVP-TE RFC 3473, RFC 3936, 4495, and 4558)) that communicate with other NEs to exchange routes, and then selects those routes based on one or more routing metrics. Thus, the NEs 770A-H (e.g., the compute resource(s) 712 executing the control communication and configuration module(s) 732A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 724. The ND control plane 724 programs the ND forwarding plane 726 with information (e.g., adjacency and route information) based on the routing structure(s). For example, the ND control plane 724 programs the adjacency and route information into one or more forwarding table(s) 734A-R (e.g., Forwarding Information Base (FIB), Label Forwarding Information Base (LFIB), and one or more adjacency structures) on the ND forwarding plane 726. For layer 2 forwarding, the ND can store one or more bridging tables that are used to forward data based on the layer 2 information in that data. While the above example uses the special-purpose network device 702, the same distributed approach 772 can be implemented on the general purpose network device 704 and the hybrid network device 706.

FIG. 7D illustrates that a centralized approach 774 (also known as software defined networking (SDN)) that decouples the system that makes decisions about where traffic is sent from the underlying systems that forwards traffic to the selected destination. The illustrated centralized approach 774 has the responsibility for the generation of reachability and forwarding information in a centralized control plane 776 (sometimes referred to as an SDN control module, controller, network controller, OpenFlow controller, SDN controller, control plane node, network virtualization authority, or management control entity), and thus the process of neighbor discovery and topology discovery is centralized. The centralized control plane 776 has a south bound interface 782 with a data plane 780 (sometime referred to the infrastructure layer, network forwarding plane, or forwarding plane (which should not be confused with a ND forwarding plane)) that includes the NEs 770A-H (sometimes referred to as switches, forwarding elements, data plane elements, or nodes). The centralized control plane 776 includes a network controller 778, which includes a centralized reachability and forwarding information module 779 that determines the reachability within the network and distributes the forwarding information to the NEs 770A-H of the data plane 780 over the south bound interface 782 (which may use the OpenFlow protocol). The centralized reachability and forwarding information module 779 further includes a control statistics profile (CSP) module 781 which causes the network controller to perform operations as described with reference to FIGS. 1-6I.

Thus, the network intelligence is centralized in the centralized control plane 776 executing on electronic devices that are typically separate from the NDs.

For example, where the special-purpose network device 702 is used in the data plane 780, each of the control communication and configuration module(s) 732A-R of the ND control plane 724 typically include a control agent that provides the VNE side of the south bound interface 782. In this case, the ND control plane 724 (the compute resource(s) 712 executing the control communication and configuration module(s) 732A-R) performs its responsibility for participating in controlling how data (e.g., packets) is to be routed (e.g., the next hop for the data and the outgoing physical NI for that data) through the control agent communicating with the centralized control plane 776 to receive the forwarding information (and in some cases, the reachability information) from the centralized reachability and forwarding information module 779 (it should be understood that in some embodiments of the invention, the control communication and configuration module(s) 732A-R, in addition to communicating with the centralized control plane 776, may also play some role in determining reachability and/or calculating forwarding information—albeit less so than in the case of a distributed approach; such embodiments are generally considered to fall under the centralized approach 774, but may also be considered a hybrid approach).

While the above example uses the special-purpose network device 702, the same centralized approach 774 can be implemented with the general purpose network device 704 (e.g., each of the VNE 760A-R performs its responsibility for controlling how data (e.g., packets) is to be routed (e.g., the next hop for the data and the outgoing physical NI for that data) by communicating with the centralized control plane 776 to receive the forwarding information (and in some cases, the reachability information) from the centralized reachability and forwarding information module 779; it should be understood that in some embodiments of the invention, the VNEs 760A-R, in addition to communicating with the centralized control plane 776, may also play some role in determining reachability and/or calculating forwarding information—albeit less so than in the case of a distributed approach) and the hybrid network device 706. In fact, the use of SDN techniques can enhance the NFV techniques typically used in the general purpose network device 704 or hybrid network device 706 implementations as NFV is able to support SDN by providing an infrastructure upon which the SDN software can be run, and NFV and SDN both aim to make use of commodity server hardware and physical switches.

FIG. 7D also shows that the centralized control plane 776 has a north bound interface 784 to an application layer 786, in which resides application(s) 788. The centralized control plane 776 has the ability to form virtual networks 792 (sometimes referred to as a logical forwarding plane, network services, or overlay networks (with the NEs 770A-H of the data plane 780 being the underlay network)) for the application(s) 788. Thus, the centralized control plane 776 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 7D shows the distributed approach 772 separate from the centralized approach 774, the effort of network control may be distributed differently or the two combined in certain embodiments of the invention. For example: 1) embodiments may generally use the centralized approach (SDN) 774, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 774, but may also be considered a hybrid approach.

While FIG. 7D illustrates the simple case where each of the NDs 700A-H implements a single NE 770A-H, it should be understood that the network control approaches described with reference to FIG. 7D also work for networks where one or more of the NDs 700A-H implement multiple VNEs (e.g., VNEs 730A-R, VNEs 760A-R, those in the hybrid network device 706). Alternatively or in addition, the network controller 778 may also emulate the implementation of multiple VNEs in a single ND. Specifically, instead of (or in addition to) implementing multiple VNEs in a single ND, the network controller 778 may present the implementation of a VNE/NE in a single ND as multiple VNEs in the virtual networks 792 (all in the same one of the virtual network(s) 792, each in different ones of the virtual network(s) 792, or some combination). For example, the network controller 778 may cause an ND to implement a single VNE (a NE) in the underlay network, and then logically divide up the resources of that NE within the centralized control plane 776 to present different VNEs in the virtual network(s) 792 (where these different VNEs in the overlay networks are sharing the resources of the single VNE/NE implementation on the ND in the underlay network).

On the other hand, FIGS. 7E and 7F respectively illustrate exemplary abstractions of NEs and VNEs that the network controller 778 may present as part of different ones of the virtual networks 792. FIG. 7E illustrates the simple case of where each of the NDs 700A-H implements a single NE 770A-H (see FIG. 7D), but the centralized control plane 776 has abstracted multiple of the NEs in different NDs (the NEs 770A-C and G-H) into (to represent) a single NE 7701 in one of the virtual network(s) 792 of FIG. 7D, according to some embodiments of the invention. FIG. 7E shows that in this virtual network, the NE 7701 is coupled to NE 770D and 770F, which are both still coupled to NE 770E.

FIG. 7F illustrates a case where multiple VNEs (VNE 770A.1 and VNE 770H.1) are implemented on different NDs (ND 700A and ND 700H) and are coupled to each other, and where the centralized control plane 776 has abstracted these multiple VNEs such that they appear as a single VNE 770T within one of the virtual networks 792 of FIG. 7D, according to some embodiments of the invention. Thus, the abstraction of a NE or VNE can span multiple NDs.

While some embodiments of the invention implement the centralized control plane 776 as a single entity (e.g., a single instance of software running on a single electronic device), alternative embodiments may spread the functionality across multiple entities for redundancy and/or scalability purposes (e.g., multiple instances of software running on different electronic devices).

Figure 8:
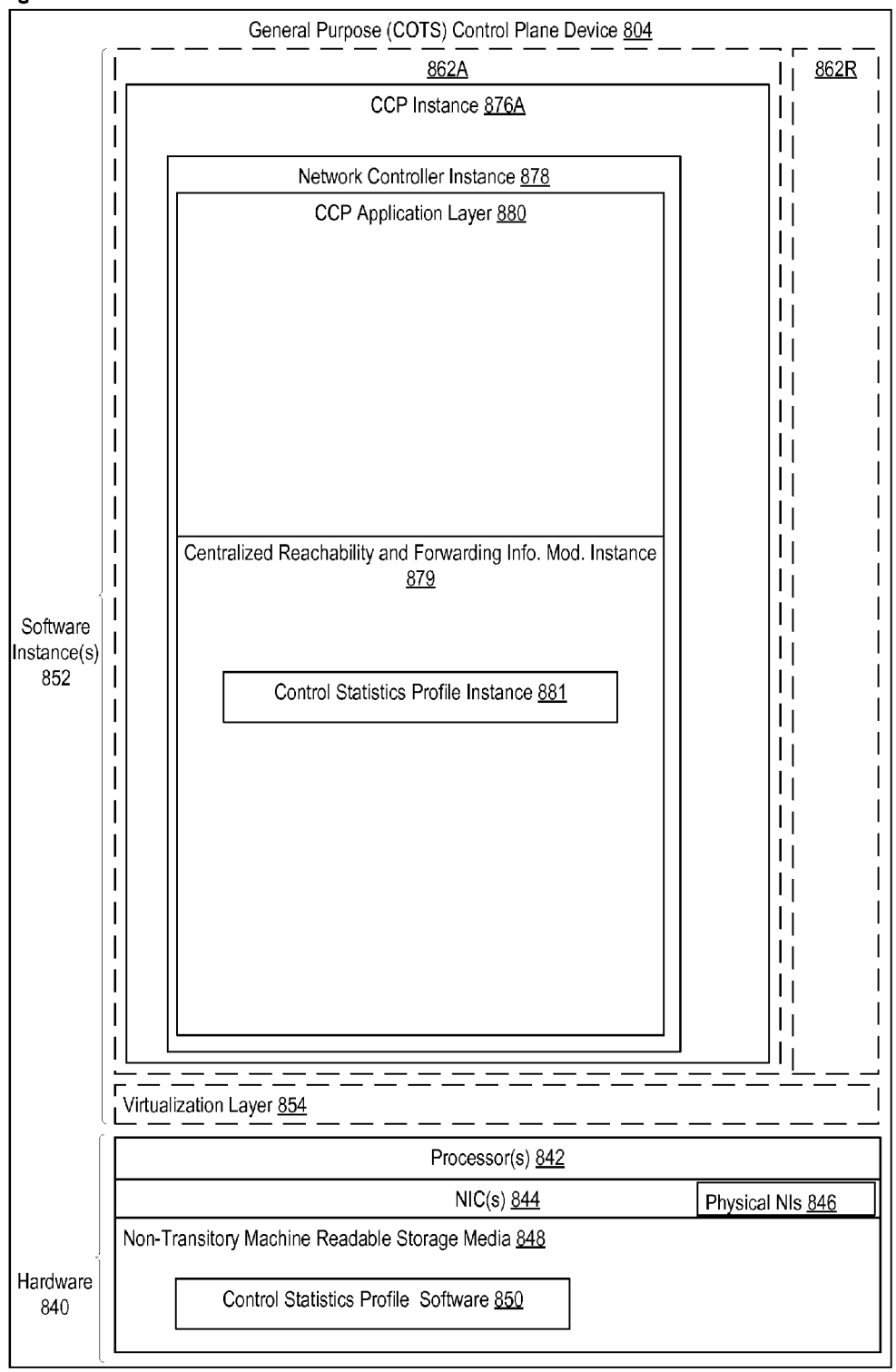
FIG. 8 illustrates a general purpose control plane device with centralized control plane (CCP) software 850), according to some embodiments of the invention.

Similar to the network device implementations, the electronic device(s) running the centralized control plane 776, and thus the network controller 778 including the centralized reachability and forwarding information module 779, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 8 illustrates, a general purpose control plane device 804 including hardware 840 comprising a set of one or more processor(s) 842 (which are often COTS processors) and network interface controller(s) 844 (NICs; also known as network interface cards) (which include physical NIs 846), as well as non-transitory machine readable storage media 848 having stored therein control statistics profile (CSP) software 850 which causes the network controller to perform operations as described with reference to FIGS. 1-6I.

In embodiments that use compute virtualization, the processor(s) 842 typically execute software to instantiate a virtualization layer 854 and software container(s) 862A-R (e.g., with operating system-level virtualization, the virtualization layer 854 represents the kernel of an operating system (or a shim executing on a base operating system) that allows for the creation of multiple software containers 862A-R (representing separate user space instances and also called virtualization engines, virtual private servers, or jails) that may each be used to execute a set of one or more applications; with full virtualization, the virtualization layer 854 represents a hypervisor (sometimes referred to as a virtual machine monitor (VMM)) or a hypervisor executing on top of a host operating system, and the software containers 862A-R each represent a tightly isolated form of software container called a virtual machine that is run by the hypervisor and may include a guest operating system; with para-virtualization, an operating system or application running with a virtual machine may be aware of the presence of virtualization for optimization purposes). Again, in embodiments where compute virtualization is used, during operation an instance of the CCP software (illustrated as CCP instance 876A) is executed within the software container 862A on the virtualization layer 854. In embodiments where compute virtualization is not used, the CCP instance 876A on top of a host operating system is executed on the "bare metal" general purpose control plane device 804. The instantiation of the CCP instance 876A, as well as the virtualization layer 854 and software containers 862A-R if implemented, are collectively referred to as software instance(s) 852.

In some embodiments, the CCP instance 876A includes a network controller instance 878. The network controller instance 878 includes a centralized reachability and forwarding information module instance 879 which includes CSP Instance 881 (which is a middleware layer providing the context of the network controller 778 to the operating system and communicating with the various NEs), and an CCP application layer 880 (sometimes referred to as an application layer) over the middleware layer (providing the intelligence required for various network operations such as protocols, network situational awareness, and user-interfaces). At a more abstract level, this CCP application layer 880 within the centralized control plane 776 works with virtual network view(s) (logical view(s) of the network) and the middleware layer provides the conversion from the virtual networks to the physical view.

The centralized control plane 776 transmits relevant messages to the data plane 780 based on CCP application layer 880 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 780 may receive different messages, and thus different forwarding information. The data plane 780 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 780, the packet (or a subset of the packet header and content) is typically forwarded to the centralized control plane 776. The centralized control plane 776 will then program forwarding table entries into the data plane 780 to accommodate packets belonging to the flow of the unknown packet. Once a specific forwarding table entry has been programmed into the data plane 780 by the centralized control plane 776, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method, in a network controller of a software-defined networking (SDN) network coupled to a network device in a data plane of the SDN network, for autonomously relaying to the network controller statistics of one or more flows received at the network device, the method comprising:
    transmitting, to the network device, a message including a statistics profile and an install profile command, wherein the statistics profile includes a type of data to be collected at the network device and a set of one or more criteria, and wherein the message including the statistics profile and the install profile command causes the network device to install the statistics profile and to transmit a statistics message associated with the one or more flows; and
    receiving, from the network device, the statistics message that includes data collected at the network device as identified by the type of data to be collected, and the data is associated with a behavior of the one or more flows, wherein the statistics message is received from the network device in response to the network device determining that the statistics profile is to be applied to the one or more flows and that each one of the one or more flows satisfies at least one criterion from the set of one or more criteria without the network device receiving a request for the data from the network controller, wherein the set of one or more criteria is at least one of an aggregate threshold value to be exceeded by a number of packets received at the network device for the one or more flows, a burst threshold value to be exceeded by a number of packets received at the network device for the one or more flows during a predetermined period of time, a time threshold value to be exceeded by a period of time during which the one or more flows are continuously received at the network device, and a threshold flow count to be exceeded by a number of flows included in a forwarding table.

2. The method of claim 1, wherein the message is a first message and the method further comprises:
    transmitting a second message to the network device, wherein the second message includes an identification of the statistics profile and a modify profile command and a set of one or more packet match fields respectively identifying the one or more flows;
    causing the network device to update the statistics profile to include the set of one or more packet match fields in response to receiving the second message; and
    wherein causing the network device to transmit the statistics message occurs when the one or more flows satisfy the at least one criterion, and the one or more flows are identified based on the set of one or more packet match fields.

3. The method of claim 1, wherein the set of one or more criteria includes a time interval at which data associated with a flow's behavior at the network device is to be periodically transmitted to the network controller based on the statistics profile.

4. A network controller to be coupled to a network device of a data plane in a software-defined networking (SDN) network, comprising:
    a processor and a memory, said memory containing instructions executable by the processor whereby the network controller is operative to:
        transmit, to the network device, a message including a statistics profile and an install profile command, wherein the statistics profile includes a type of data to be collected at the network device and a set of one or more criteria, and wherein the message including the statistics profile and the install profile command causes the network device to install the statistics profile and to transmit a statistics message associated with one or more flows; and
        receive, from the network device, the statistics message that includes data collected at the network device as identified by the type of data to be collected, and the data is associated with a behavior of the one or more flows, wherein the statistics message is received from the network device in response to the network device determining that the statistics profile is to be applied to the one or more flows and that each one of the one or more flows satisfies at least one criterion from the set of one or more criteria without the network device receiving a request for the data from the network controller, wherein the set of one or more criteria is at least one of an aggregate threshold value to be exceeded by a number of packets received at the network device for the one or more flows, a burst threshold value to be exceeded by a number of packets received at the network device for the one or more flows during a predetermined period of time, a time threshold value to be exceeded by a period of time during which the one or more flows are continuously received at the network device, and a threshold flow count to be exceeded by a number of flows included in a forwarding table.

5. The network controller of claim 4, wherein the message is a first message and the network controller is further operative to:
    transmit a second message to the network device, wherein the second message includes an identification of the statistics profile and a modify profile command and a set of one or more packet match fields respectively identifying the one or more flows;
    cause the network device to update the statistics profile to include the set of one or more packet match fields in response to receiving the second message; and
    wherein causing the network device to transmit the statistics message occurs when the one or more flows satisfy the at least one criterion, and the one or more flows are identified based on the set of one or more packet match fields.

6. The network controller of claim 4, wherein the set of one or more criteria includes a time interval at which data associated with a flow's behavior at the network device is to be periodically transmitted to the network controller based on the statistics profile.

7. A method in a network device of a data plane coupled with a network controller in a software-defined networking (SDN) network, the method comprising:
receiving, from the network controller, a first message including a statistics profile and an install profile command, wherein the statistics profile includes a type of data to be collected at the network device and a set of one or more criteria;
determining that the statistics profile is to be applied to a flow;
determining that at least one criterion from the set of one or more criteria included in the statistics profile is satisfied by the flow, wherein the set of one or more criteria is at least one of an aggregate threshold value to be exceeded by a number of packets received at the network device for the one or more flows, a burst threshold value to be exceeded by a number of packets received at the network device for the one or more flows during a predetermined period of time, a time threshold value to be exceeded by a period of time during which the one or more flows are continuously received at the network device, and a threshold flow count to be exceeded by a number of flows included in a forwarding table; and
automatically transmitting to the network controller a statistics message, in response to determining that the at least one criterion is satisfied and without receiving a request from the network controller to transmit the statistics message, wherein the statistics message includes an identification of the flow and collected data associated with the behavior of the flow at the network device as identified by the type of data to be collected included in the statistics profile.

8. The method of claim 7 further comprising prior to the determining:
storing, in response to receiving the first message, the statistics profile.

9. The method of claim 8 further comprising:
receiving a second message from the network controller, wherein the second message includes a statistics profile identifier, a set of one or more packet match fields respectively identifying one or more flows, and a modify profile command; and
updating the stored statistics profile to further include the set of one or more packet match fields;
wherein the automatically transmitting the statistics message is performed when the flows satisfies the at least one criterion, and the flow is part of the one or more flows that are identified based on the set of one or more packet match fields.

10. The method of claim 7, wherein the set of one or more criteria includes a time interval at which data associated with a flow's behavior at the network device is to be periodically transmitted to the network controller based on the statistics profile.

11. A network device of a data plane to be coupled to a network controller in a software-defined networking (SDN) network, comprising:
a processor and a memory, said memory containing instructions executable by the processor whereby the network device is operative to:
receive, from the network controller, a first message including a statistics profile and an install profile command, wherein the statistics profile includes a type of data to be collected at the network device and a set of one or more criteria;
determine that the statistics profile is to be applied to a flow;
determine that at least one criterion from the set of one or more criteria included in the statistics profile is satisfied by the flow, wherein the statistics profile further includes a type of data to be collected associated with a behavior of the flow at the network device, wherein the set of one or more criteria is at least one of an aggregate threshold value to be exceeded by a number of packets received at the network device for the one or more flows, a burst threshold value to be exceeded by a number of packets received at the network device for the one or more flows during a predetermined period of time, a time threshold value to be exceeded by a period of time during which the one or more flows are continuously received at the network device, and a threshold flow count to be exceeded by a number of flows included in a forwarding table; and
automatically transmit to the network controller a statistics message, in response to determining that the at least one criterion is satisfied and without the receipt of a request from the network controller to transmit the statistics message, wherein the statistics message includes an identification of the flow and collected data associated with the behavior of the flow at the network device as identified by the type of data to be collected included in the statistics profile.

12. The network device of claim 11, wherein the network device is further operative to, prior to determining that at least one criterion is satisfied:
store, in response to receiving the first message, the statistics profile.

13. The network device of claim 12 wherein the network device is further operative to:
receive a second message from the network controller, wherein the second message includes a statistics profile identifier, a set of one or more packet match fields respectively identifying one or more flows, and a modify profile command; and
update the stored statistics profile to further include the set of one or more packet match fields;
wherein the automatically transmitting the statistics message is performed when the flows satisfies the at least one criterion, and the flow is part of the one or more flows that are identified based on the set of one or more packet match fields.

14. The network device of claim 11, wherein the set of one or more criteria includes a time interval at which data associated with a flow's behavior at the network device is to be periodically transmitted to the network controller based on the statistics profile.

* * * * *